United States Patent
Kaneko

(10) Patent No.: US 6,930,798 B1
(45) Date of Patent: Aug. 16, 2005

(54) IMAGE FORMATION SYSTEM CONTROL METHOD, IMAGE FORMATION SYSTEM, AND STORAGE MEDIUM

(75) Inventor: Satoshi Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,438

(22) Filed: May 10, 2000

(30) Foreign Application Priority Data

May 12, 1999 (JP) .......................................... 11-131652

(51) Int. Cl.$^7$ .............................. B41B 1/00; H04N 1/46; G06F 3/12

(52) U.S. Cl. ........................ 358/1.9; 358/501; 358/1.13

(58) Field of Search ................................ 358/515, 296, 358/1.15, 1.14, 1.13, 1.9, 1.1, 501, 540; 399/18, 403, 76, 82, 382, 381, 130, 364, 17; 382/252; 345/764, 724; 270/52.02

(56) References Cited

U.S. PATENT DOCUMENTS

| | | | | |
|---|---|---|---|---|
| 4,961,092 A | * | 10/1990 | Rabb et al. .................. | 399/403 |
| 4,989,852 A | | 2/1991 | Gunther, Jr. .................. | 270/56 |
| 5,150,167 A | | 9/1992 | Gonda et al. ................ | 355/313 |
| 5,220,417 A | * | 6/1993 | Sugiura ....................... | 358/515 |
| 5,226,094 A | * | 7/1993 | Eschbach .................... | 382/252 |
| 5,461,469 A | | 10/1995 | Farrell et al. ................ | 355/321 |
| 5,489,969 A | * | 2/1996 | Soler et al. .................... | 399/18 |
| 5,548,390 A | * | 8/1996 | Sugisaki et al. ............. | 399/364 |
| 5,568,246 A | * | 10/1996 | Keller et al. .................. | 399/382 |
| 5,664,074 A | * | 9/1997 | Kageyama et al. ......... | 358/1.14 |
| 5,781,825 A | * | 7/1998 | Okamoto ...................... | 399/17 |
| 5,859,711 A | * | 1/1999 | Barry et al. .................. | 358/296 |
| 5,881,212 A | * | 3/1999 | Morita ....................... | 358/1.13 |
| 5,940,186 A | * | 8/1999 | Barry et al. ................. | 358/296 |
| 5,987,226 A | * | 11/1999 | Ishikawa et al. ........... | 358/1.13 |
| 6,029,023 A | * | 2/2000 | Munemori et al. ........... | 399/66 |
| 6,201,946 B1 | * | 3/2001 | Takeuchi et al. ............ | 399/381 |
| 6,204,927 B1 | * | 3/2001 | Saito et al. ................. | 358/1.12 |
| 6,224,048 B1 | * | 5/2001 | Motamed .................. | 270/52.02 |
| 6,256,107 B1 | * | 7/2001 | Toda .......................... | 358/1.15 |
| 6,256,463 B1 | * | 7/2001 | Manzer et al. ................. | 399/76 |
| 6,263,173 B1 | * | 7/2001 | Nakamura et al. ............ | 399/82 |
| 6,348,971 B2 | * | 2/2002 | Owa et al. ................. | 358/1.15 |
| 6,363,231 B1 | * | 3/2002 | Manzer et al. ................ | 399/82 |
| 6,462,756 B1 | * | 10/2002 | Hansen et al. .............. | 345/764 |
| 6,501,929 B1 | * | 12/2002 | Warbus et al. .............. | 399/130 |
| 6,693,721 B1 | * | 2/2004 | Suzuki ....................... | 358/1.15 |

(Continued)

FOREIGN PATENT DOCUMENTS

| EP | 05-019993 | 1/1993 |
|---|---|---|
| EP | 06-255283 | 9/1994 |

*Primary Examiner*—Madeleine Nguyen
(74) *Attorney, Agent, or Firm*—Fitzpatrick, Cella, Harper & Scinto

(57) ABSTRACT

In case of outputting data including mixed plural different-type images, productivity and cost performance are improved without an operator's complicated manual intervention. To do so, a color printer, a black and white printer and a finisher are electrically connected with others through a data communication path such that these devices can perform data communication with others, and also these devices are mechanically connected with others such that the sheets discharged from the respective printers can be carried to a sheet carrying path of the finisher without any operator manual intervention. Further, in a the series of images, pages corresponding to the color images are subjected to image formation by the color printer and pages corresponding to the black and white images are subjected to image formation by the black and white printer. Also the finisher selectively sets the image formation operation in the color printer and the image formation operation in the black and white printer to be on standby, so as to compile the sheets from these printers as one sheet sheaf with the continuous page order maintained.

29 Claims, 14 Drawing Sheets

U.S. PATENT DOCUMENTS

| | | | |
|---|---|---|---|
| 6,727,999 B1 * | 4/2004 | Takahashi | 358/1.15 |
| 6,738,151 B1 * | 5/2004 | Kato | 358/1.12 |
| 2001/0021036 A1 * | 9/2001 | Nimura et al. | |
| 2001/0043346 A1 * | 11/2001 | Roztocil et al. | |
| 2001/0043357 A1 * | 11/2001 | Owa | |
| 2002/0041392 A1 * | 4/2002 | Tokura | |
| 2002/0126309 A1 * | 9/2002 | Shimada | |

* cited by examiner

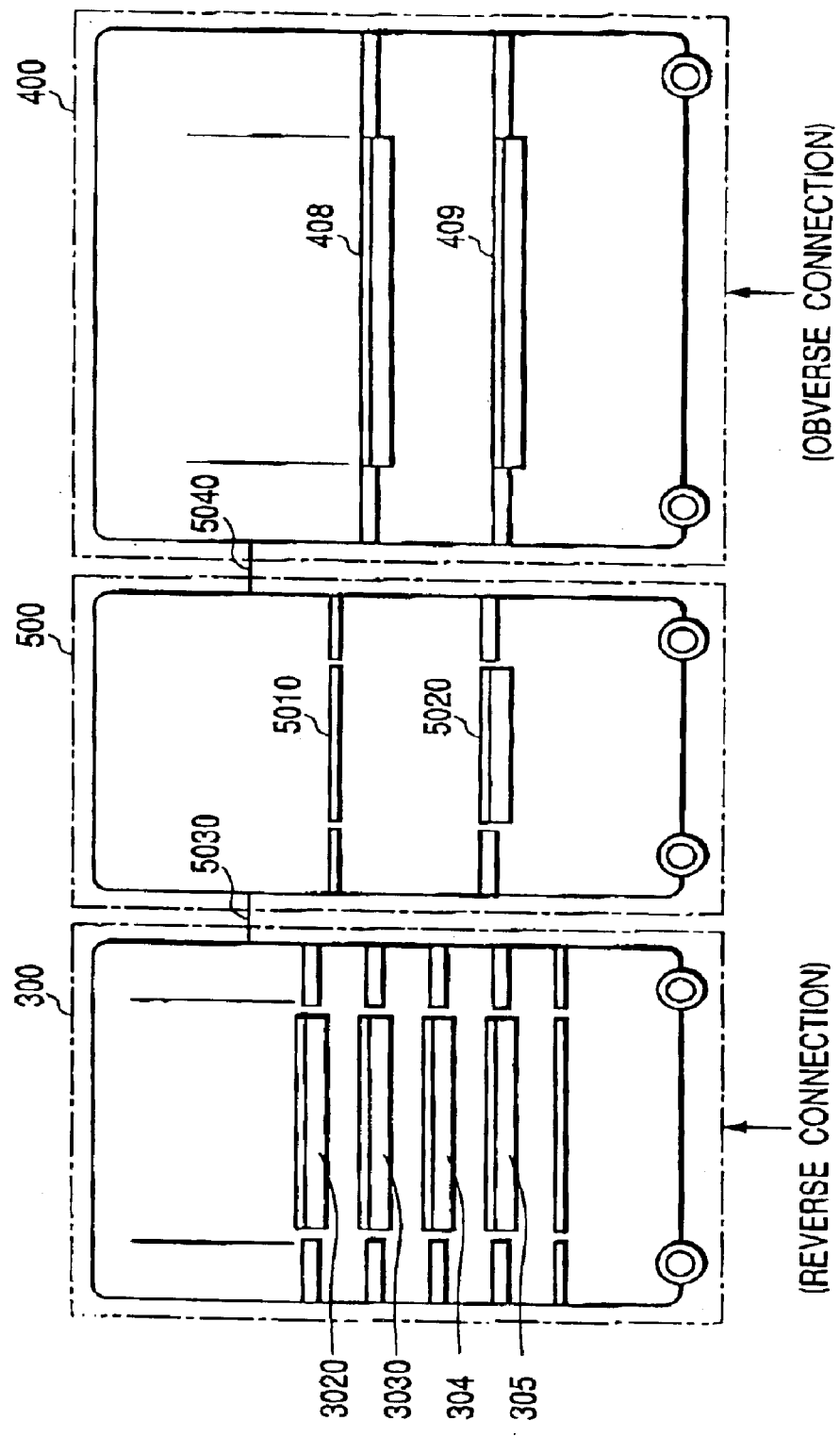

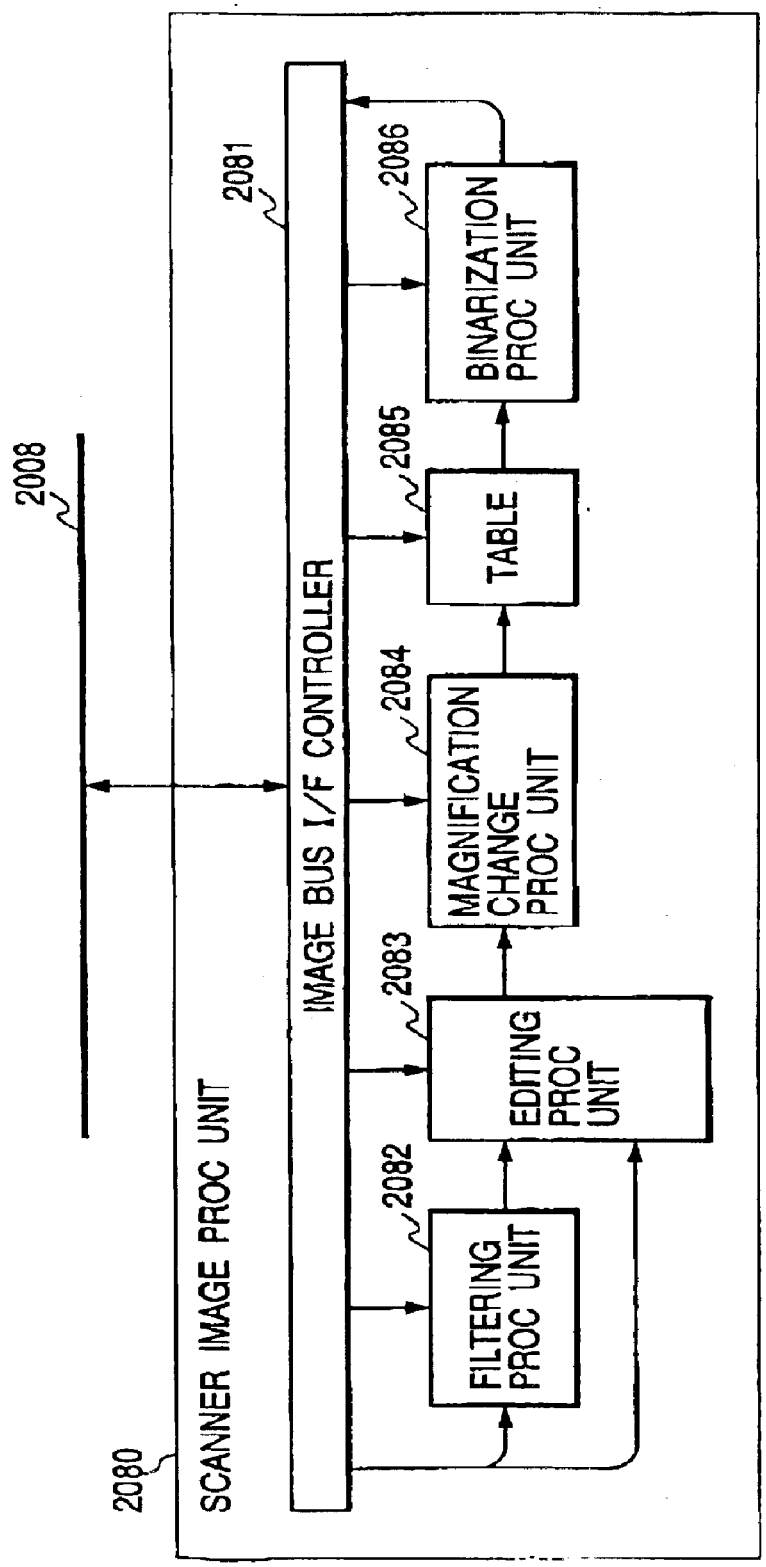

IMAGE FORMATION SYSTEM CONTROL METHOD, IMAGE FORMATION SYSTEM, AND STORAGE MEDIUM

BACKGROUND OF THE INVENTION

1. Field of the Invention

The present invention relates to an image formation system for forming an image on a sheet, a control method for controlling the image formation system, and a storage medium or the like for storing a control program to control the image formation system.

2. Related Background Art

In recent years, an image formation system has been proposed in which an image input apparatus such as a scanner or the like and an image formation apparatus such as a printer or the like are connected on a predetermined transmission medium be able to output an image input by the image input apparatus with the image formation apparatus desired by a user.

However, in such conventional systems, even when one job mixedly includes plural kinds of data, e.g., color data, monochrome (black-and-white: B/W) data, etc., only one of the following image formation apparatuses, e.g., a color printer and a monochrome printer can print the mixed job. Although the color printer can print data in full color, the monochrome printer is superior to the color printer in the features of printing speed, costs and the like.

Therefore, for example, it is possible to cause the monochrome printer to print pages including only monochrome images. However, in such a case, an operator (or a user) has to judge whether to cause the color printer or the monochrome printer to perform the printing for each page, to generate page printing designation for each page, and to actually select the printer to be used for each page printing designation This may be troublesome for the operator.

Further, in the above case, the operator has to rearrange in the page order the sheets which were subjected to the printing processing by the color printer and the monochrome printer and to compile and bind the rearranged sheets into one, increasing the operator's workload. Therefore, to decrease the operator's workload, it is possible, for example, for a system in which groups of sheets on which the images were respectively formed by the printers are gathered from sheet discharge units of the respective printers by the operator himself, the gathered sheets are set in a specific sheet processing apparatus capable of automatically rearranging the sheets in the page order, and then the sheets are compiled as one data and subjected to postprocessing by the specific sheet processing apparatus. However, even in this case, an operator's assistance is indispensable in sequential processing until one book-bound print job is formed. Thus, there is some concern that an operator who is unfamiliar to the sheet processing apparatus erroneously operates or handles it because the operator does not understand how to set the group of sheets output from the respective image formation apparatuses. As a result, the processing to compile and bind the sheets, output from the respective image formation apparatuses, is not performed correctly in the sheet processing apparatus, and when the sheets are subjected to, e.g., stapling processing the sheets are wasted. It is difficult for an operator who is unfamiliar with to the operation of such a sheet processing apparatus to use and manage such a system.

In consideration of the above, for example, sequential processing until one bookbound print job is formed, it is desirable to reduce an operator's assistive operation and to automatize use of the system. However, conventionally, proposals for kinds of devices to be used, and how to operate, cooperate, adjust and control each device have not been submitted. Thus, it is difficult to be able to output a user's desired data and to solve disadvantages described above.

SUMMARY OF THE INVENTION

An object of the present invention is to provide an image formation system control method, an image formation system and a storage medium which could solve the above-described disadvantage.

Another object of the present invention is to provide an image formation system control method, an image formation system and a storage medium which can improve productivity and cost performance without an operator's complicated assistive operation in case of outputting data mixedly including plural different-type images.

Other objects and features of the present invention will become apparent from the following detailed description and the attached drawings.

BRIEF DESCRIPTION OF THE DRAWINGS

FIGS. 4A and 4B are diagrams showing structures of printer and finisher and a connection situation thereof, according to the embodiment;

FIG. 5 is a block diagram showing a structure of a scanner image processing unit according to the embodiment;

DETAILED DESCRIPTION OF PREFERRED EMBODIMENT

Hereinafter, one embodiment of the present invention will be explained with reference to the attached drawings.

Figure 1:
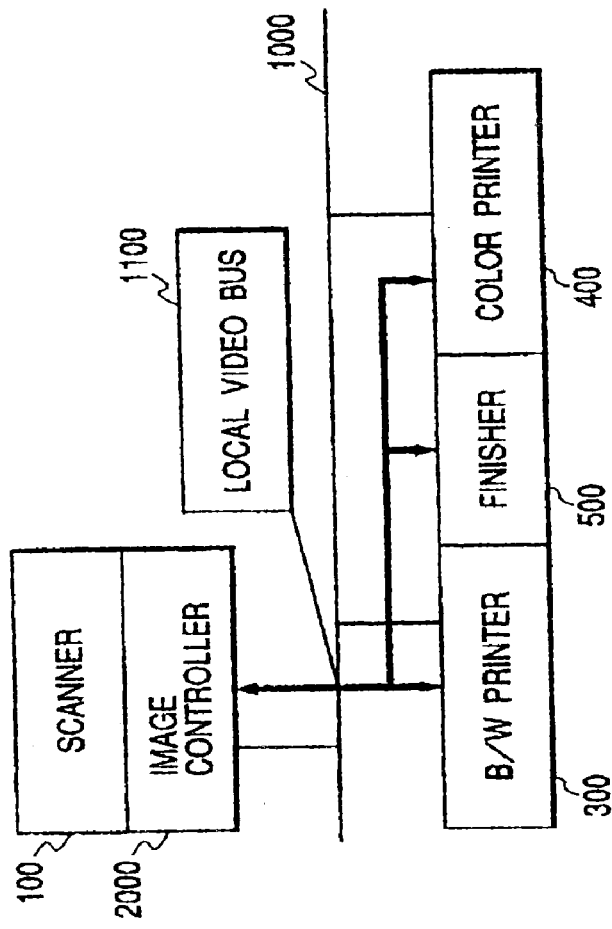
FIG. 1 is a block diagram showing a structure of an image formation system according to the embodiment of the present invention.

FIG. 1 is a block diagram showing a structure of an image formation system according to the embodiment of the present invention. The image formation system is composed of a scanner 100 which acts as an image input apparatus being an image generation source and can read a color original, a B/W (black and white) printer 300 which acts as an image formation apparatus, a color printer 400 which also acts as the image formation apparatus, a finisher 500 which acts as a sheet processing apparatus and can perform on-line sheet processing to sheets (referred to as postprocessing hereinafter) such as a stapling processing and the like, an Ethernet 1000 which acts as a transmission means in a known network structure, a local (or dedicated) video bus 1100 which connects the scanner 100 with the B/W printer 300, and the like. It should be noted that image data which is transmitted from a host computer (not shown) or the like acting as the image generation source can also be output by the image formation system. In the embodiment, where the scanner 100, the B/W printer 300 and the color printer 400 are disposed independently, these apparatuses exchange data through a predetermined data communication path will be explained by way of example. However, an apparatus such as a B/W copying machine or a color copying machine which contains the scanner and the printer as one body may be applied to this image formation system.

An image controller 2000 which performs image reading control and image transmission control is connected with the scanner 100 through a local bus (not shown). The finisher 500 is connected with the B/W printer 300 and the color printer 400 through a local serial bus.

Figure 4B:
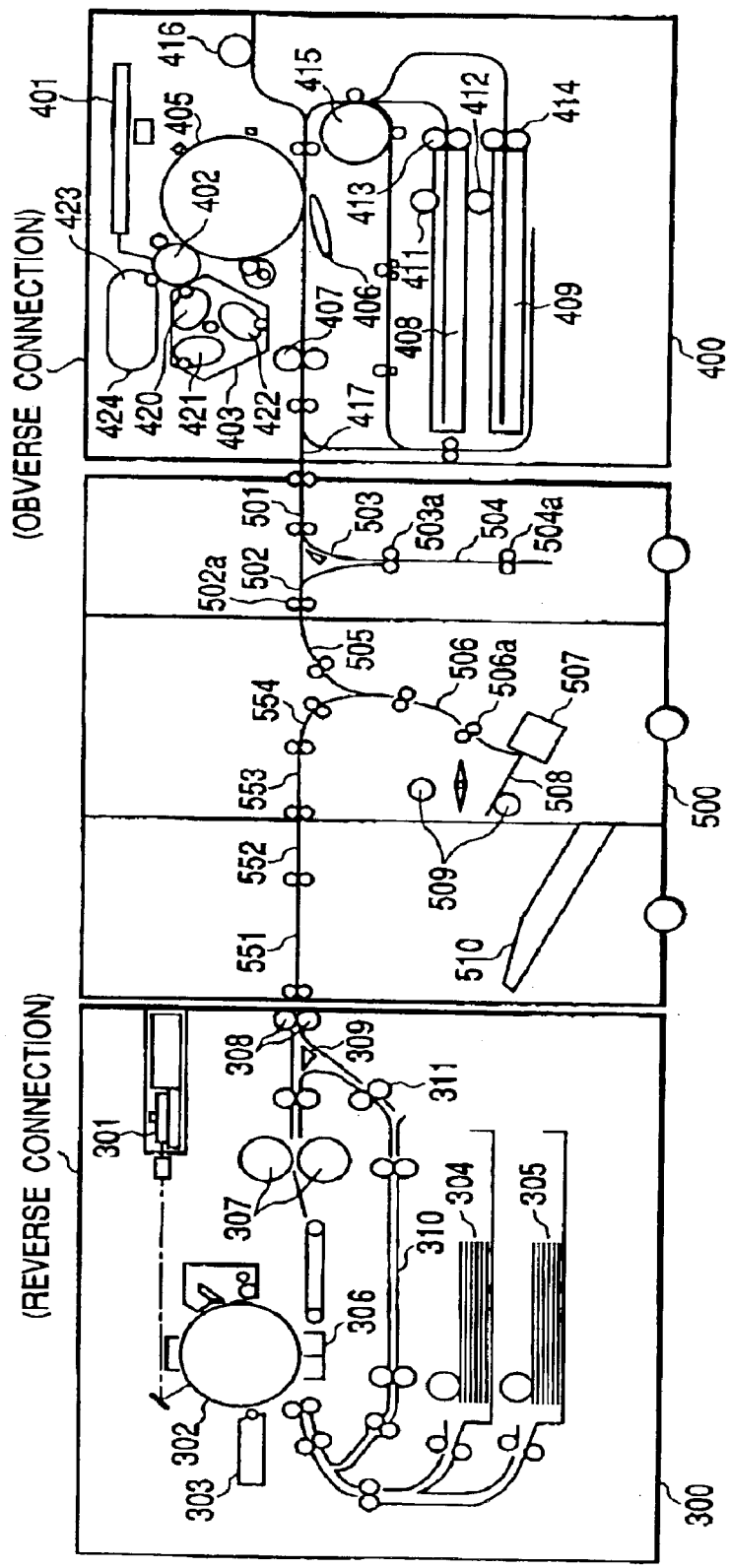

The B/W printer 300, the color printer 400 and the finisher 500 are connected in such a connection status as shown in FIGS. 4A and 4B. As described above, the B/W and color printers 300 and 400 and the finisher (the sheet processing apparatus) 500 are electrically connected through a predetermined data signal line such that data communication can be performed among these apparatuses. Also, the B/W and color printers 300 and 400 and the finisher 500 are mechanically connected such that the sheet subjected to image formation by the B/W printer 300 and then discharged and the sheet subjected to image formation by the color printer 400 and then discharged can be directly carried to a sheet carrying path in the finisher 500. The details will be explained later with reference to FIGS. 4A and 4B and the like.

Each of the B/W printer 300, the color printer 400 and the finisher 500 independently contains a control unit (including a CPU (central processing unit) or the like), like the image controller 2000. Each apparatus can appropriately confirm a processing situation of itself, and notify other apparatus included in the image formation system of information concerning the processing situation and status information through a predetermined data communication path. For example, on the basis of detection signals from sheet detection sensors (not shown) disposed at respective points on carrying paths in the finisher 500, the control unit of the finisher 500 confirms whether or not the sheet exists on the sheet carrying path in the finisher 500, where the sheet is positioned on the carrying path if the sheet exists, and whether or not a sheet jam such as a backup jam, a delay jam or the like occurs. Then the control unit of the finisher 500 notifies the control unit of the color printer 400 and the control unit of the B/W printer 300 or the image controller 2000, of information concerning the confirmed result through the data communication path. In response to a request from other apparatus, the control unit of the finisher 500 can notify the printers and the like of information concerning what functions the finisher has, information concerning the type of the finisher, connection information concerning whether or not another apparatus is connected to the finisher, connection information concerning whether the other apparatus is connected with the right side of the finisher, the left side thereof or on both sides thereof, if it is connected, information concerning the arrangement order of the apparatuses, and the like.

For example, the B/W printer 300 declares to be a B/W image formation apparatus and notifies the image controller 2000 that another apparatus is connected with only the right side of the printer 300 itself, through the data communication path. The finisher 500 declares to be a sheet processing apparatus and notifies the image controller 2000 that other apparatuses are connected on both the left and right of the finisher 500 itself, through the data communication path. The color printer 400 declares to be a color image formation apparatus and notifies the image controller 2000 that another apparatus is connected with only the left side of the printer 400 itself, through the data communication path. The image controller 2000 which received the notification can confirm that the BW printer 300, the color printer 400 and the finisher 500 exist in the image formation system, and that the B/W printer 300, the finisher 500 and the color printer 400 are connected sequentially queuing up from the left. Also, it is possible to apply a structure that an operator previously inputs data concerning the connection information by using the operation unit 2012 of the image controller 2000.

As shown in FIGS. 4A and 4B, the color printer 400 which is connected at the right of the finisher 500 faces frontward (i.e., the side to which an operator operates). This is called obverse connection. Conversely, the B/W printer 300 which is connected at the left of the finisher 500 faces backward. This is called reverse connection.

The reason why the B/W printer 300 is connected with the finisher 500 backward will be described hereinafter. An image formation apparatus such as a copying machine, a printer or the like operates generally on its front side. In such a situation, a sheet is carried from a right-side sheet feeder, an image is formed on the carried sheet by the medial image formation apparatus, the sheet on which the image was formed is carried left, and the carried sheet is discharged outward through a left-side sheet discharge unit. To be able to configure the structure of the conventional image formation apparatus, the B/W printer 300 is connected backward at the left of the finisher 500. For this reason, it is good without purposely changing the structure itself of the B/W printer 300 to construct the image formation system such that image formation processing can be performed using the usual structure of the B/W printer 300.

Even if the color printer 400 is connected at the left of the finisher 500 and the B/W printer 300 is connected at the right thereof, it is necessary to connect the color printer 400 in a backward orientation and connect the B/W printer 300 in a frontward orientation.

In a case where an image formation apparatus is of a type having a sheet discharge port on the right side of the body, carrying an image-formed sheet (i.e., the sheet on which the image was formed) from the left to the right, and discharging the carried sheet from a discharge port on the right side of the body, the image formation apparatus is connected at the left of the finisher 500, such the image formation apparatus is connected in a frontward orientation.

Figure 3:
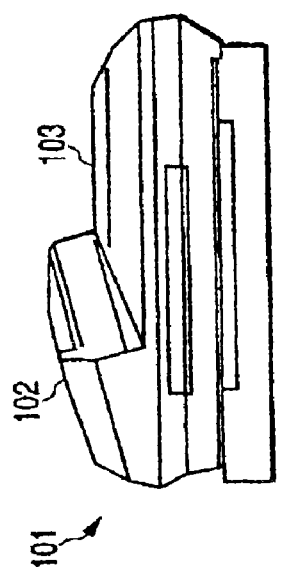
FIG. 3 is a side-view showing a schematic structure of a scanner according to the embodiment.

The structure of the scanner 100 will be explained with reference to FIG. 3.

The scanner 100 which can respond to both-types of data (i.e., color image data and B/W image data) illuminates and scans an image of an original by using a CCD line sensor (not shown) to convert the image into an electrical signal as raster image data. The original is set on an original tray 102 of an original feeder 101. When the operator handles a later-described operation unit 2012 to instruct an image reading start, a later-described CPU 2001 issues an instruction to the scanner 100. In response to this instruction, the scanner 100 feeds each original of a sheaf set with the page order adjusted (e.g., the page order of the originals in this sheaf continues from a head page to a final page, the head page corresponds to the uppermost original of this sheaf, and the final page corresponds to the lowermost original thereof), one by one from the head page in due order from the original tray 102 to the image reading position (called head-page processing). Image reading of the original image is performed at this image reading position. In prescanning processing the original, R (red), G (green) and B (blue) outputs from the CCD line sensor are transferred to the CPU 2001. When there is a difference among these R, G and B outputs, the CPU 2001 can judge that the original is a color original. Conversely, when there is no difference, the CPU 2001 can judge that the original is a B/W original. This judgment processing for each page is performed from the head page in due order.

FIGS. 4A and 4B are the diagrams showing the structures of the B/W printer 300, the color printer 400 and the finisher 500.

As described above, the B/W printer 300, the color printer 400 and the finisher 500 are electrically connected through the predetermined data signal line such that the data communication can be performed among these apparatuses. Also, the B/W and color printers 300 and 400 and the finisher 500 are mechanically connected such that the sheet subjected to the image formation by the B/W printer 300 and then discharged and the sheet subjected to the image formation by the color printer 400 and then discharged can be directly carried to the sheet carrying path in the finisher 500 (e.g., without an operator's interaction to set the output sheaf to a predetermined tray of the finisher 500). Further, the color printer 400 connected at the right of the finisher 500 faces frontward, and the B/W printer 300 connected at the left of the finisher 500 faces backward.

FIG. 4A is a simple schematic diagram showing the structures of the B/W printer 300, the color printer 400 and the finisher 500. The details of the structures will be explained later with reference to FIG. 4B.

The B/W printer 300 converts the B/W raster image data into an image to be formed on a recording sheet in any of an electrophotographic system using a photosensitive drum or a photosensitive belt, an inkjet system for discharging ink droplets from a micronozzle array, and the like. An printing operation is started responsive to an instruction from the later-described controller CPU 2001. The B/W printer 300 contains plural sheet feed stages to be able to select different recording sheet sizes and directions. Concretely, the B/W printer 300 contains recording sheet cassettes 3020, 3030, 304 and 305.

Like the B/W printer 300, the color printer 400 converts the color raster image data into an image to be formed on a recording sheet. Also the color printer 400 contains plural sheet feed stages, i e., recording sheet cassettes 408 and 409.

The finisher 500 contains a connection (or coupling) tray unit 5010 and a stacker unit 5020. The finisher 500 is connected with the B/W printer 300 through a connection unit 5030 and connected with the color printer 400 through a connection unit 5040. The recording sheets subjected to the image formation by the printers 300 and 400 are respectively carried to the connection tray unit 5010 and subjected to the postprocessing such as stapling processing or the like, and the processed sheets are then discharged to the stacker unit 5020.

The above-described structure will be explained in detail with reference to FIG. 4B. FIG. 4B is a detailed sectional view of the B/W printer 300, the color printer 400 and the finisher 500.

The B/W printer 300 operation will be explained with reference to FIG. 4B. An electrical signal supplied to the B/W printer 300 is converted into a light signal by an exposure control unit 301, and a photosensitive body 302 is irradiated and swept by the light signal from the exposure control unit 301. A latent image formed by the irradiation light on the photosensitive body 302 is developed by a development unit 303. A recording sheet (or a transfer sheet) is fed from the recording sheet cassette 304 or 305 (the cassettes 3020 and 3030 of FIG. 4A are not shown) at a timing synchronous with the leading edge of the latent image, and the developed image is transferred to the sheet by a transfer unit 306. The transferred image is fixed to the sheet by a fixing unit 307, and the sheet is discharged outside by a sheet discharge unit 308. In this case, since the B/W printer 300 faces backward, the sheet discharge port is on the right side thereof (i.e., on the left side of the finisher 500).

Figure 16A:
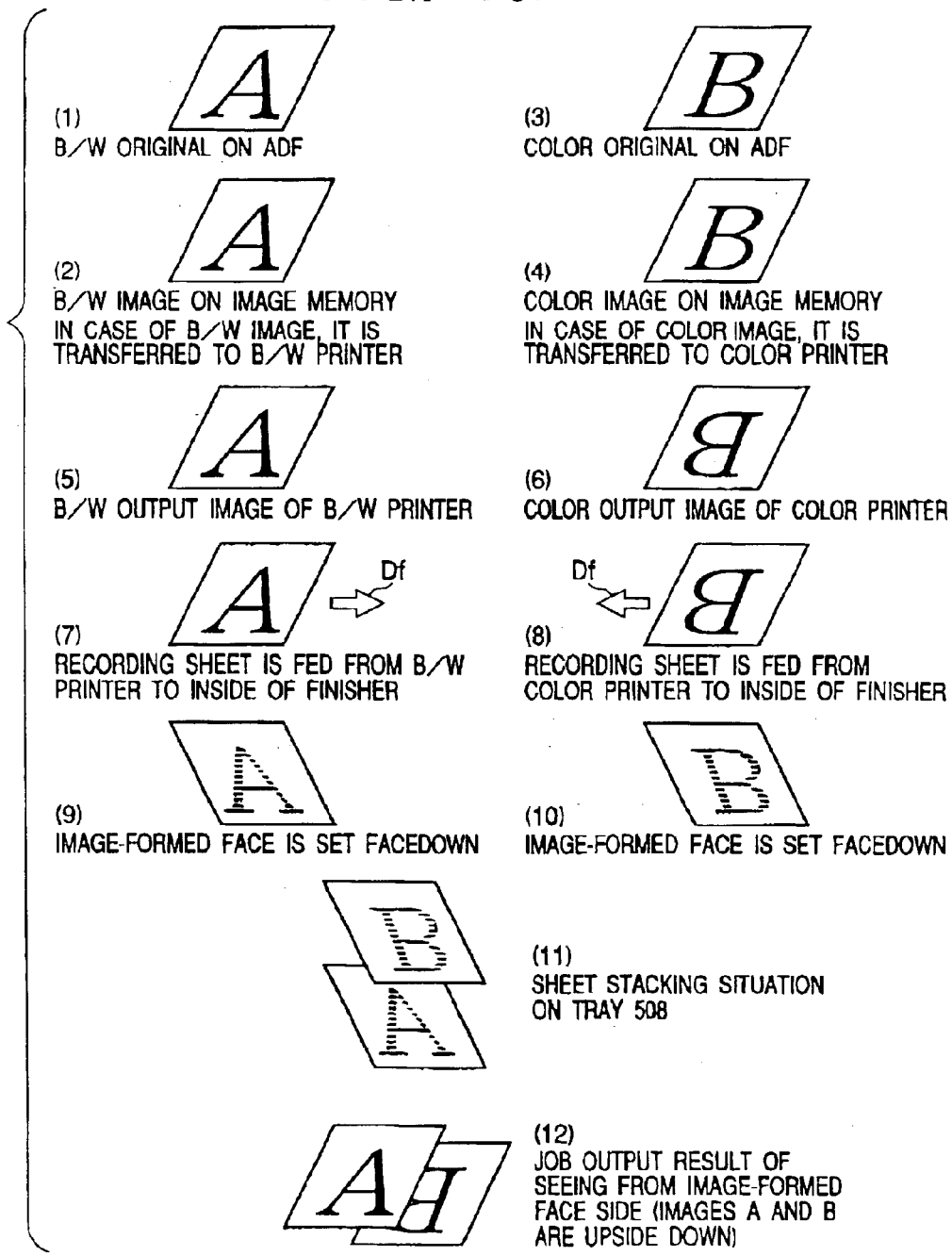
FIGS. 16A and 16B are diagrams for explaining a sequential processing flow in a case where sheets subjected to image formation by the printers are compiled and bound as one sheaf of sheets by the finisher, according to the embodiment.
Figure 16B:
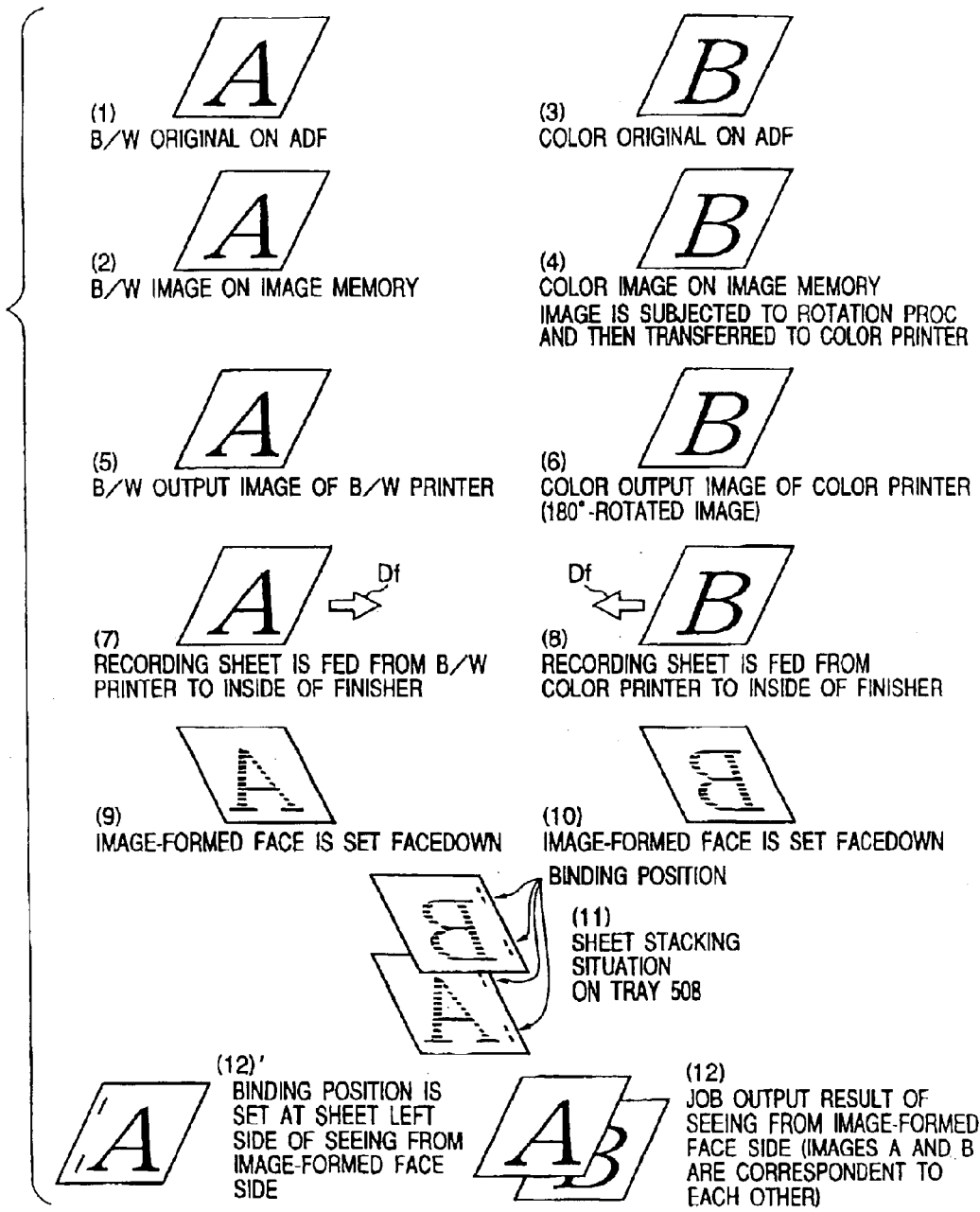

The direction of the image on the recording sheet in a case where the sheet on which the image was formed by the B/W printer 300 is captured into the finisher 500 will be explained. Ordinarily, image formation is performed such that the direction of the image formed on the recording sheet by the image formation apparatus, such as a copying machine or the like, is different by 180° from the direction of the image on the original put on the original tray. However, the apparatus having the structure as described above is connected with the finisher 500 backward. When the recording sheet is carried from the B/W printer 300 to the inside of the finisher 500, the direction of the image on this sheet is in such a status as a status (7) shown in FIG. 16B (0° image). In this status, the recording sheet is carried from the B/W printer 300 to the finisher 500 (a direction Df in FIGS. 16A and 16B represents a sheet carrying direction in case of introducing the sheet from the printer into the finisher). The details of FIGS. 16A and 16B will be described later. The image-formed sheet (i.e., the sheet on which the image was formed) output from the sheet discharge unit 308 is supplied to the finisher 500.

A method of outputting images sequentially read onto front and back faces of one output sheet will be explained. In a case where the output sheet (i.e., the recording sheet) fixed by the fixing unit 307 is carried to the sheet discharge unit 308, when the trailing edge of the sheet reaches in the vicinity of the sheet discharge unit 308, the sheet carrying direction is reversed and a carrying direction change member (i.e., a flapper) 309 is rotated to carry the sheet to a sheet refeed stacker 310. On the sheet refeed stacker 310, the recording sheet on which the image was transferred is once stacked for refeeding it. When a next original is prepared, its original image is read in the same manner as above. However, since the transfer sheet (i.e., the recording sheet) is fed from the sheet refeed stacker 310, the two original images can be eventually output respectively onto the front and back faces of one output sheet (i.e., the recording sheet).

Further, a method of inverting the image-formed sheet and discharging the inverted sheet facedown (i.e., a facedown sheet discharging method) will be explained. In order to once carry the image-formed sheet fixed by the fixing unit 307 to the side of a pair of rollers (simply referred to as a roller) 311, the flapper 309 is switched to the side of the roller 311, whereby the sheet is guided to this side. After the trailing edge of the sheet passed the flapper 309, the roller 311 is then rotated in the reverse direction to carry the sheet to the sheet discharge unit 308 (this is called switchback carrying). Ordinarily, when the originals are stacked on the original tray faceup (i.e., in a status that the sheet face on which the image was formed is turned upward) and fed from an original carrying apparatus in an upper separation manner (i.e., a manner of separating and feeding the sheets one by one from the uppermost sheet), the originals are discharged facedown to the outside such that the page order of the originals is not confused.

As above, the B/W printer 300 can discharge the sheets to the outside in a facedown processing mode (a mode of discharging the image-formed sheet facedown). However, when a mode of compiling and binding the sheets on which the images were formed by one (own) apparatus (the B/W printer 300 in this case) and the sheets on which the images were formed by another apparatus (the color printer 400 in this case) as one group in the finisher 500 is selected by the operation unit 2012 or the like, in consideration of later complication of the sheets on which the images were formed by the one (own) apparatus (the B/W printer 300) and the sheets from the other apparatus, it is inhibited to execute the facedown sheet discharge mode by the one (own) apparatus. Instead, the sheets are discharged outside in an ordinary faceup processing mode (a mode of discharging the image-formed sheet facedown). It should be noted that the B/W printer 300 can perform the head-page processing to sequentially perform the image formation from the head page.

The color printer 400 operation will be explained.

In FIG. 4B, numeral 401 denotes a scanner unit which receives an image signal (/VDO) from a printer controller (not shown), and irradiates a corresponding laser beam onto a photosensitive body 402 to form an electrically changed image thereon. The photosensitive body 402 reaches a black development unit 404 and a color development unit 403 while rotating counterclockwise. Each of the development units 403 and 404 acts to set toner (i.e., perform development) according to the charges on the photosensitive body 402. When the image is the B/W image, only the black development unit 404 operates. When the image is the color image, the black and color development units 404 and 403 sequentially operate. Next, a toner image formed on the photosensitive body 402 is transferred to an intermediate transfer body 405 which is provided adjacently to the photosensitive body 402 and rotated clockwise. The intermediate transfer body 405 is rotated once when the B/W image is developed, and rotated four times when the color image is developed. Thus, the B/W or color toner image is formed on the intermediate transfer body 405.

The operation to form the color image on the intermediate transfer body 405 will be explained in detail.

In FIG. 4B, numeral 420 denotes a yellow development unit, numeral 421 denotes a magenta development unit, numeral 422 denotes a cyan development unit; and numeral 423 denotes a black development unit.

The color development unit 403 can be rotated clockwise, and thus the development units 420 to 422 can be connected with the photosensitive body 402, whereby yellow, magenta and cyan toner images can be respectively formed on the intermediate transfer body 405 through the photosensitive body 402.

On the other hand, a recording member such as a recording sheet or the like on which an image is to be recorded is fed from the upper cassette 408 by a pickup roller 411 or the lower cassette 409 by a pickup roller 412, carried according to a pair of sheet feed rollers (simply referred to as a sheet feed roller) 413 or 414, and further carried to a registration roller by a carrying roller 415.

The registration roller carries the recording sheet such that the sheet reaches a position between the intermediate transfer body 405 and a transfer belt 406 at a timing synchronous with the end of the toner image formation on the intermediate transfer body 405. When the sheet reaches this position, the toner image on the intermediate transfer body 405 is transferred to the recording sheet by using the transfer belt 406. The image transferred to the recording sheet is then fixed by heat and pressure through a pair of fixing rollers (simply referred to as a fixing roller) 407.

The recording sheet on which the image was formed and fixed is fed to the finisher 500 through a sheet discharge port 417. In an ordinary operation mode, the direction of the image formed on the sheet discharged from the color printer 400 is different by 180° from the direction of the original image placed on the original tray. Like the B/W printer 300, the color printer 400 can perform the head-page processing to sequentially perform the image formation from the head page.

As shown in FIG. 4B, the B/W printer 300 is connected backward at the left of the finisher carrying path 551, and the color printer 400 is connected frontward at the right of the finisher carrying path 501. Of course, the finisher 500 faces frontward.

A case where the sheets discharged from the B/W printer 300 and the color printer 400 are compiled and bound as one group (i.e., a sheaf) and the sheaf of sheets is subjected to the stapling processing will be explained.

First, the sheets discharged from the B/W printer 300 are stacked on a processing tray 508 through carrying paths 551, 552, 553, 554 and 506 and a pair of rollers (simply referred to as a roller) 506a. The image-formed sheet is introduced faceup (i.e., in the status that the image-formed face is turned upward) into the finisher 500 from the side of the carrying path 551. The sheet from the B/W printer 300 is inverted through the curved path composed of the carrying paths 553, 554, 506 and the like, whereby the sheet is stacked facedown on the processing tray 508. Numeral 507 denotes a stapler which performs the stapling processing to the sheaf of plural sheets stacked on the processing tray 508 as one group.

Since the sheets are sequentially stacked facedown (i.e., in the status that the image-formed face is turned downward) on the processing tray 508, the stapler 507 staples the sheets from the image-formed face side (i.e., a staple penetrates from the bottom side to the top side of the sheaf of sheets). Since the stapler 507 performs stapling at the trailing edge side of the sheet, the binding position is on the left side of the sheet from the viewpoint of the image-formed face. This binding position is appropriate for use.

On the other hand, the image-formed sheet is introduced faceup into the finisher 500 from the side of a carrying path 501. The sheet from the color printer 400 is once guided to the side of a carrying path 504 by switching a flapper 503 operable by a solenoid (not shown) to the side of the carrying path 504. As soon as the trailing edge of the sheet passes the flapper 503, the flapper 503 is switched to the side of a pair of rollers (simply referred to as a roller) 502a, and pairs of rollers (simply referred to as rollers) 503a and 504a are together rotated in the reverse direction to carry the sheet to the side of the roller 502a as making its trailing edge the head.

Thus, the sheet from the color printer 400 is switched back and carried to the side of the roller 502a through the carrying path 504, whereby the sheet carried from the color printer 400 faceup (i.e., in the status that its image-formed face is turned upward) is inverted. The sheet which passed the roller 502a in the status that its image-formed face is turned downward is stacked on the processing tray 508 as it is through the carrying paths 505 and 506.

By the above processing, the faces of the sheets from the B/W printer 300 and the color printer 400 can be adjusted. Thus, the plural sheets which are carried respectively from the different printers through the different carrying paths can be stacked on the processing tray 508 in the status that their image-formed faces are all turned downward.

Further, for example, the stapler 507 is operated in response to an instruction from the operation unit 2012 to perform the stapling processing to the sheaf mixedly including the sheets carried from the printers 300 and 400 and staked on the processing tray 508.

Then, after closing a rocking guide, sheaf discharge rollers 509 are driven to discharge the sheaf including the sheets compiled as one group on the processing tray 508 to a stack tray 510. The discharged sheaves are sequentially stacked on the stack tray 510 sheaf by sheaf.

Further, an adjustment member (not shown) on the processing tray 508 is driven to adjust the sheaves of sheets stacked and control a sorting direction (i.e., the direction perpendicular to the sheet carrying direction) of the sheaves of sheets to be discharged to the stack tray 510, whereby it is possible to discharge the sheaves of sheets as staggering them for each group. Thus, plural sheaves of sheets are stacked on the stack tray 510 in the staggering status, thereby sorting each sheaf of sheets.

In the embodiment, a system of inverting the sheet by switching back it in the finisher 500 was described. However, a structure of inverting the sheet by switching back it in the printer can be applied.

The directions of the images which were formed on the sheets fed from the printers 300 and 400 and stacked in the statuses as above will be explained in detail with reference to FIGS. 16A and 16B.

FIGS. 16A and 16B depict the sequential processing in a case where the sheets from the B/W printer 300 and the color printer 400 are compiled and bound as one group to form one book-bound job in the finisher 500.

In the example shown in FIG. 16A, it is assumed that an original sheaf of one job which mixedly includes an original with a B/W image "A" printed (a status (1)) and an original with a color image "B" printed (a status (3)) is set by an operator to the original tray 102 of the scanner 100 in a stacking direction (i.e., faceup and left binding position). Further, it is assumed that, after the originals were read by the scanner 100, the read original image data are stored in a memory of the image controller 2000 in the directions indicated by statuses (2) and (4) respectively. Further, it is assumed that the B/W image "A" and the color image "B" are transferred respectively to the B/W printer 300 and the color printer 400, and the images are formed by the respective printers.

When the B/W image "A" shown in the status (2) is ordinarily formed on the sheet by the B/W printer 300 and the image-formed sheet is then discharged to the finisher 500, since the B/W printer 300 is connected backward to the left of the finisher 500, as described above, the image-formed sheet is discharged in a status (5). Then, as shown in a status (7), the sheet is carried from the left to the right with the image-formed face faceup and introduced from the side of the carrying path 551 into the finisher 500. Further, as described above, the sheet is inverted through the curved path in the finisher 500 and stacked on the processing tray 508 with the image-formed face facedown (a status (9)).

On the other hand, since the color printer 400 is connected frontward with the finisher 500 as described above, when the image formation is performed in the conventional manner, the formed image is output in the status that its direction is different by 180° from the direction of the image on the original put on the original tray 102 of the scanner 100 (a status (6)). Therefore, when the sheet, subjected to the image formation in this manner, is carried from the right to the left and introduced from the side of the carrying path 501 into the finisher 500 (a status (8)), the sheet is inverted in the carrying path 504 (a status (10)), and the inverted sheet is stacked on the processing tray 508, then the sheets are stacked in a status (11).

When the sheets are stacked on the processing tray 508 in the above manner, the output result from the viewpoint of the image-formed face is in a status (12). Namely, the direction of the B/W image "A" formed on the sheet from the B/W printer 300 is different by 180° from the direction of the color image "B" formed on the sheet from the color printer 400.

In the case where the sheets are stacked on the processing tray 508 in the status that the directions of the images "A" and "B" are different from each other, the operator has to perform complicated working when the sheets are stacked on the stack tray 510. That is, the operator must confirm the direction of each sheet and correct the direction when he finds an inappropriate page, whereby an operator's complicated assistance is necessary. Further, for example, when sheet editing processing such as the stapling processing or the like was performed by the stapler 507 to the sheets on the processing tray 508, such the output result can not be used, and the resources are thus wasted. As above, various disadvantages occur.

Thus, in the embodiment, processing which will be explained with reference to FIG. 16B is also performed. Like FIG. 16A, it is assumed that an original sheaf of one job which mixedly includes an original with a B/W image "A" printed (a status (1)) and an original with a color image "B" printed (a status (3)) is set by an operator to the original tray 102 of the scanner 100 in a shown stacking direction (i.e., faceup and left binding position). Further, it is assumed that, after the originals were read by the scanner 100, the read original image data are stored in the memory of the image controller 2000 in the directions indicated by statuses (2) and (4) respectively. The processing up to this is the same as the processing shown in FIG. 16A. The B/W image "A" is transferred to the B/W printer 300 as it is. However, the color image "B" stored in the memory is subjected to rotation processing by a later-described image rotation processing unit 2030 shown in FIGS. 2, 8 and the like to rotate the color image "B" in the status (4) by 180°, and the rotated color image "B" is transferred to the color printer 400. The printed results, based on the image formation processing by the respective printers 300 and 400, are in statuses (5) and (6) respectively. As can be seen from the status (6), the data of which direction is the same as the direction of the image printed on the original set in the original tray 102 of the scanner can be obtained by the above processing.

If it is assumed that the B/W printer 300 is connected frontward at the right of the finisher 500 and the color printer 400 is connected backward at the left of the finisher 500, the CPU 2001 of the image controller 2000 does not perform any rotation processing to the image data to be output to the color printer 400 connected at the left of the finisher 500 but transfers the image data to the color printer 400 as it is. Meanwhile, it is controlled by the CPU 2001 that rotation processing to the image data to be output to the B/W printer 300 connected at the right of the finisher 500 is performed by the image rotation processing unit 2030 shown in FIGS. 2, 8 and the like and the rotation-processed image is transferred to the B/W printer 300.

Further, unlike the B/W printer 300 in the embodiment, if it is assumed that a B/W printer of the type which has a sheet discharge port at the right of the body, by which an image-formed sheet is carried from the left to the right, by which the carried sheet is discharged from the discharge port at the right of the body, and by which image formation can be performed in such an output status as the status (5) is connected frontward at the left of the finisher 500, and a color printer of the type which is the same as that of the color printer 400 in the embodiment is connected frontward at the right of the finisher 500, then the CPU 2001 of the image controller 2000 transfers the B/W image data and the color image data respectively to the B/W printer and the color printer as it is without performing any rotation processing.

Namely, the CPU 2001 of the image controller 2000 judges whether or not the image rotation processing is to be performed for each image formation apparatus, on the basis of judgment material information as to how the image formation apparatus is connected with the finisher 500, how the arrangement order of the finisher 500 and the plural image formation apparatuses connected with the finisher 500 is (e.g., the color printer 400 is connected frontward at the right of the finisher 500, the B/W printer 300 is connected backward at the left of the finisher 500, and the like), what type the connected image formation apparatus is (e.g., the B/W printer 300 is the image formation apparatus of the type that the sheet discharge unit is at the left of the body from the viewpoint of the front, the image formation is performed on the sheet fed from the right, the image-formed sheet is carried to the sheet discharge unit at the left, and the image of which direction is different by 180° from the direction of the input original image is formed on the sheet), and the like. Then, it is controlled based on the judged result to appropriately perform image rotation processing and output the processed image to the image formation apparatus.

When the image formation apparatus has an image rotation function, it is of course possible to perform the image rotation processing on the side of the image formation apparatus. In such a case, the CPU 2001 of the image controller 2000 correlates the image data before the rotation processing with a command including an instruction to request the image rotation processing, and transfers the command to the image formation apparatus together with the image data. Then the image formation apparatus performs the image rotation processing and forms the rotation-processed image on the sheet.

As described above, each apparatus (the B/W printer 300, the color printer 400 and the finisher 500) independently contains the control unit (including the CPU or the like) and can output the above information through the data communication path in response to the request from the CPU 2001 of the image controller 2000. On the basis of the data or the like included in the information acquired from each apparatus, the CPU 2001 of the image controller 2000 can judge whether or not the image rotation processing is to be performed.

The sheet on which the image formation was performed by the B/W printer 300 is carried from the left to the right with its image-formed face faceup as shown in the statuses (5) and (7), and the carried sheet is introduced from the side of the carrying path 551 into the finisher 500. Then, as described above, the sheet is inverted through the curved path in the finisher 500, and the sheet is stacked on the processing tray 508 with its image-formed face facedown (a status (9)).

On the other hand, the sheet on which the image formation was performed by the color printer 400 (the status (6)) is carried from the right to the left and introduced from the side of the carrying path 501 into the finisher 500 (a status (8)). Then the sheet is inverted through the carrying path 504 (a status (10)), and the inverted sheet is stacked on the processing tray 508. Thus, the sheets are stacked on the processing tray 508 as in a status (11), thereby unifying the directions of the image-formed faces and the images (see an output result from the viewpoint of the image-formed face in a status (12)).

When the binding (or stapling) processing is performed by the stapler 507 to the trailing-edge part of the sheets stacked in this status, it is possible to perform the appropriate binding that the binding position is on the left side of the sheaf of sheets from the viewpoint of the image-formed face (a status (12')).

Figure 2:
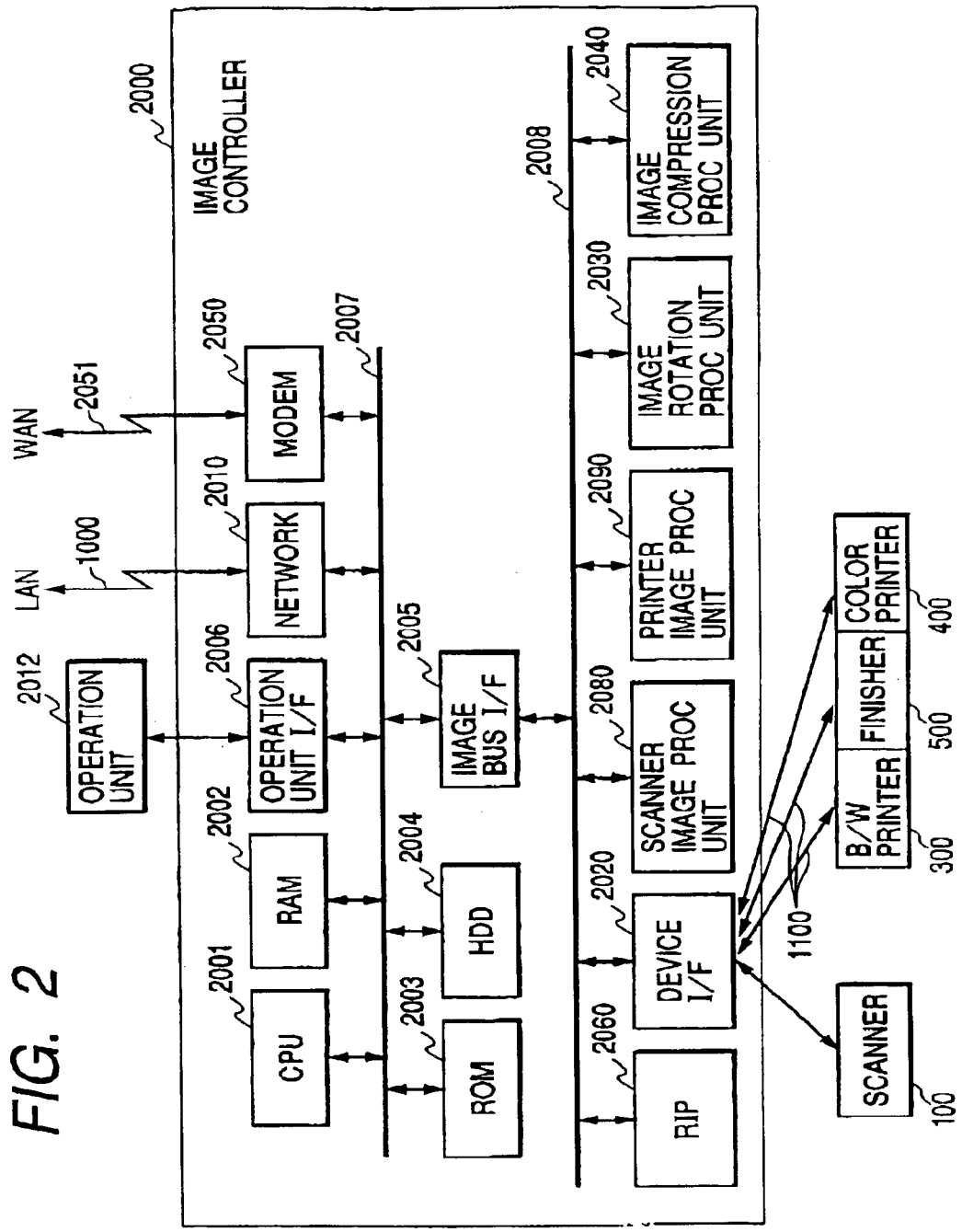
FIG. 2 is a block diagram showing a schematic structure of an image controller according to the embodiment.

FIG. 2 is a block diagram showing a structure of the image controller 2000.

The image controller 2000 is connected with the scanner 100, the B/W printer 300 and the color printer 400 through the local video bus 1100. The image controller 2000 is connected with the Ethernet (a LAN (local area network)) 1000 and a WAN (wide area network) 2051 to input and output image information and device information.

The image controller 2000 is composed of the CPU 2001, a RAM (random-access memory) 2002, a ROM (read-only memory) 2003, an HDD (hard disk drive) 2004, an image bus I/F (interface) 2005, an operation unit I/F 2006, a network 2010, a device I/F 2020, an image rotation processing unit 2030, an image compression processing unit 2040, a modem 2050, an RIP (raster image processor) 2060, a scanner image processing unit 2080, and a printer image processing unit 2090.

The CPU 2001 is the controller which controls the entire system. The RAM 2002 is used as the working memory when the CPU 2001 operates and is also used as the memory which temporarily stores image data. The ROM 2003 is the boot ROM which stores a boot program for the system. The HDD 2004 is the memory which stores system software and image data. The image bus I/F 2005 is the bus bridge which connects a system bus 2007 with an image bus 2008 for transferring image data at high speed to convert a data structure. The operation unit I/F 2006 is the interface which connects the image controller 2006 with the operation unit 2012 and outputs to the operation unit 2012 the image data to be displayed on a display unit (not shown) of the operation unit 2012. The network 2010 is connected with the Ethernet (LAN) 1000 to input and output various information. The device I/F 2020 connects the scanner 100, the B/W printer 300 and the color printer 400 being image input/output devices with the image controller 2000 to convert synchronous system/asynchronous system of the image data. The image rotation processing unit 2030 performs the rotation processing to image data. The image compression processing unit 2040 performs image compression/decompression processing to multivalue image data in a JPEG (Joint Photographic Experts Group) system, and to binary data in a JBIG (Joint Bi-level Image Experts Group) system, an MMR (Modified Modified Read) system and an MH (Modified Huffman) system. The modem 2050 is connected to the WAN 2051 to input and output various information. The RIP 2060 expands a PDL (Page Description Language) code into a bit-map image. The scanner image processing unit 2070 performs correction processing, editing processing and the like to input image data. The printer image processing unit 2080 performs correction processing, resolution conversion processing and the like to output image data from the printers 300 and 400.

The CPU 2001, the RAM 2002, the ROM 2003, the HDD 2004, the operation unit I/F 2006, the network 2010 and the modem 2050 are disposed on the system bus 2007. Further, the device I/F 2020, the image rotation processing unit 2030, the image compression processing unit 2040, the RIP 2060, the scanner image processing unit 2080 and the printer image processing unit 2090 are disposed on the image bus 2008.

Figure 11:
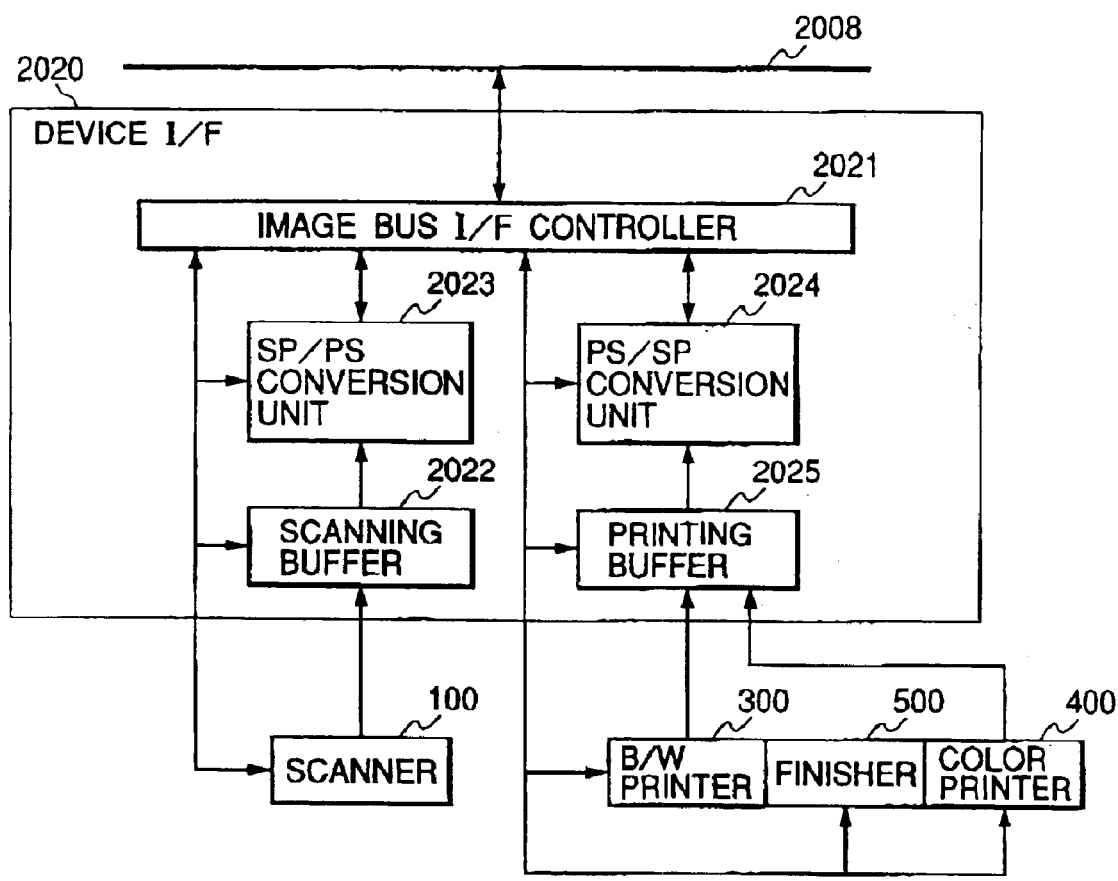
FIG. 11 is a block diagram showing a device I/F (interface) of the image controller according to the embodiment.

FIG. 11 is a block diagram showing the structure of the device I/F 2020.

The device I/F 2020 is composed of an image bus I/F (interface) controller 2021, a scanning buffer 2022, an SP/PS (serial-to-parallel/parallel-to-serial) conversion unit 2023, a PS/SP (parallel-to-serial/serial-to-parallel) conversion unit 2024 and a printing buffer 2025.

The image bus I/F controller 2021 which is connected to the image bus 2008 controls bus accessing sequence, controls each unit in the device I/F 2020, and generates a timing signal. The image bus I/F controller 2021 generates control signals respectively to the external scanner 100, the printers 300 and 400, and the finisher 500. The scanning buffer 2022 temporarily stores image data from the scanner 100, and outputs the image data in synchronism with the image bus 2008. The SP/PS conversion unit 2023 arranges in due order or decomposes the image data stored in the scanning buffer 2022 to convert it into a data width of the image data capable of being transferred to the image bus 2008. The PS/SP conversion unit 2024 decomposes or arranges in due order the image data transferred from the image bus 2008 to convert it into a data width of the image data capable of being stored in the printing buffer 2022. The printing buffer 2025 temporarily stores the image data transferred from the image bus 2008, and outputs the image data in synchronism with the printers 300 and 400.

Next, a processing procedure in case of image scanning by the device I/F 2020 will be explained.

The image data transferred from the scanner 100 is stored in the scanning buffer 2022 in synchronism with the timing signal from the scanner 100.

In a case where the image bus 2008 is a PCI (Peripheral Component Interface) bus, when the image data of 32 bits or more is entered into the scanning buffer 2022, the image data of 32 bits is transferred from the scanning buffer 2022 to the SPIPS conversion unit 2023 in FIFO (first-in/first-out), the transferred data is converted into 32-bit image data, and the obtained 32-bit image data is transferred to the image bus 2008 through the image bus I/F controller 2021.

In a case where the image bus 2008 is an IEEE (Institute of Electrical and Electronic Engineers) 1394, the image data in the scanning buffer 2022 is transferred to the SP/PS conversion unit 2023 in FIFO, the transferred data is converted into serial image data, and the obtained serial image data is transferred to the image bus 2008 through the image bus I/F controller 2021.

Next, a processing procedure in case of image printing by the device I/F 2020 will be explained.

In the case where the image bus 2008 is the PCI bus, the image data of 32 bits sent from the image bus 2008 is received by the image bus I/F controller 2021, the received image data is transferred to the PS/SP conversion unit 2024, the transferred image data is decomposed into the image data of the input data bit number, and the decomposed image data is stored in the printing buffer 2025.

In the case where the image bus 2008 is the IEEE 1394, the serial image data sent from the image bus 2008 is received by the image bus I/F controller 2021, the received image data is transferred to the PS/SP conversion unit 2024, the transferred data is decomposed into the image data of the input data bit numbers of the printers 300 and 400, and the decomposed image data is stored in the printing buffer 2025.

Then, in synchronism with the timing signals sent from the printers 300 and 400, the image data in the printing buffer 2025 is transferred to the printers 300 and 400 in FIFO.

Figure 8:
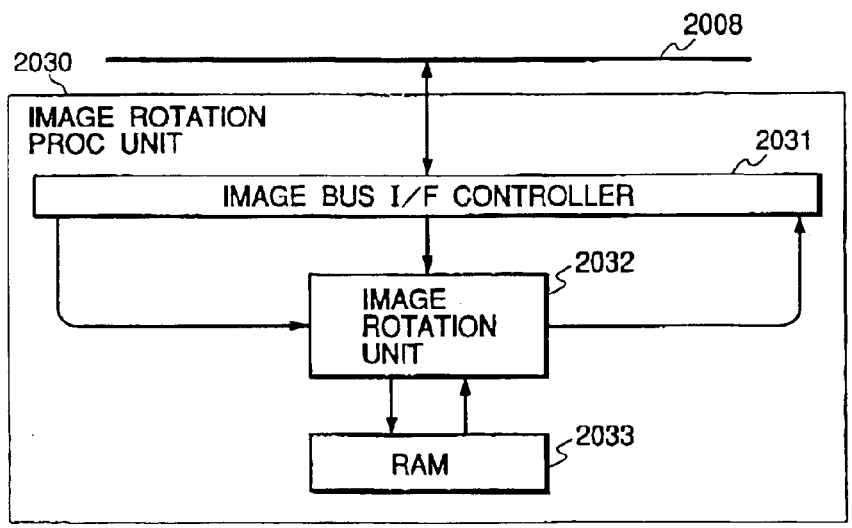
FIG. 8 is a block diagram showing a structure of an image rotation processing unit according to the embodiment.

FIG. 8 is a block diagram showing the structure of the image rotation processing unit 2030.

The image rotation processing unit 2030 is composed of an image bus UF controller 2031, an image rotation unit 2032 and a RAM 2033.

The image bus I/F controller 2031 which is connected with the image bus 2008 has a function to control its bus accessing sequence. Further, the image bus I/F controller 2031 performs mode setting control to the image rotation unit 2032 and timing control to transfer the image data to the image rotation unit 2032.

An image rotation processing procedure of the image rotation processing unit 2030 will be explained.

Setting for image rotation controlling is performed to the image bus I/F controller 2031 by the CPU 2001 of the image controller 2000 shown in FIG. 2 through the image bus 2008. By this setting, the image bus I/F controller 2031 performs setting (e g., image size setting, rotation direction setting, rotation angle setting and the like) necessary for the image rotation to the image rotation unit 2032. After performing the necessary setting, the CPU 2001 of the image controller 2000 again allows the image bus I/F controller 2031 to transfer the image data.

According to the allowance, the image bus I/F controller 2031 starts to transfer the image data from the RAM 2002 of the image controller 2000 or each device on the image bus 2008. In this case, it is assumed that the image size to be subjected to the 32 bit image rotation is 32×32 bits and the image data is transferred to the image bus 2008 in the 32-bit unit (the image to be managed is a binary image).

Figure 9:
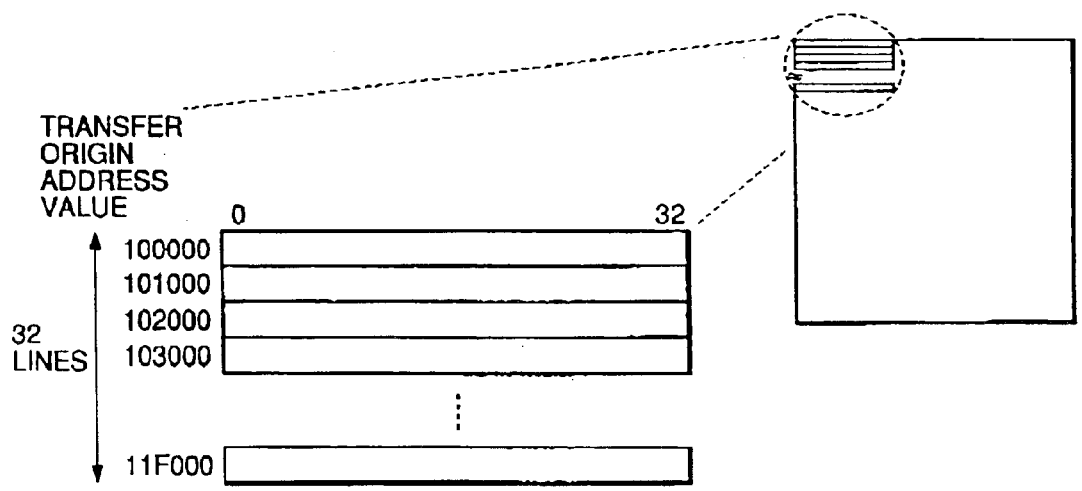
FIG. 9 is a diagram for explaining an image rotation processing procedure in the image rotation processing unit according to the embodiment;.

To obtain the image of 32×32 bits, it is necessary to perform the data transfer in the above unit three times and to transfer the image data from discontinuous (or irregular) addresses (see FIG. 9).

Figure 10:
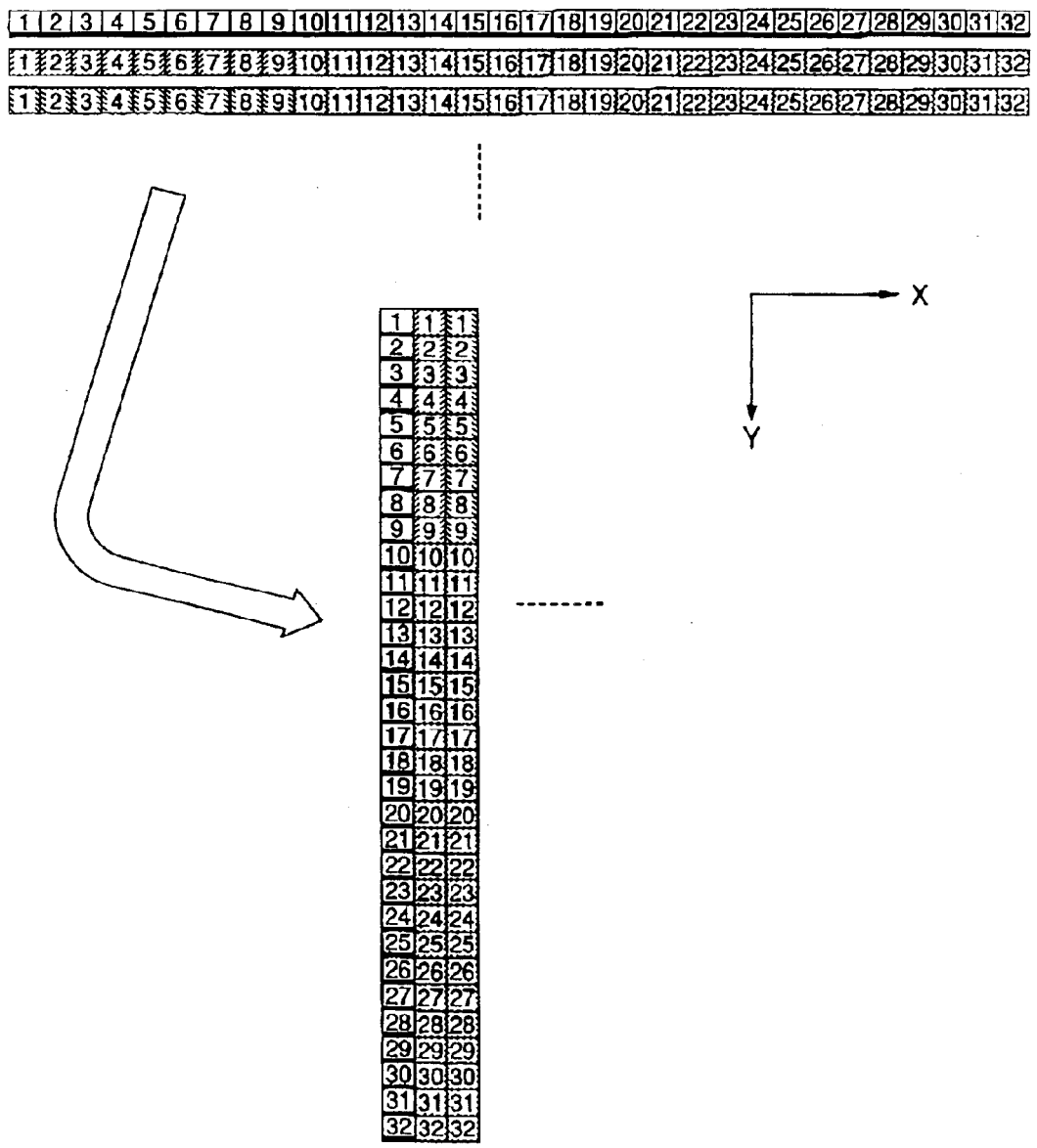
FIG. 10 is a diagram for explaining the image rotation processing procedure in the image rotation processing unit according to the embodiment.

The image data transferred based on discontinuous addressing is written in the RAM 2033 such that at the reading time the image has been rotated at a desired angle. For example, when the image is rotated counterclockwise by 90°, the first-transferred 32-bit image data is written along a Y direction as shown in FIG. 10. Then the written image data is read along an X direction, thereby rotating the image.

After the image rotation (i.e., image data writing in the RAM 2033) of 32×32 bits has ended, the image rotation unit 2032 reads the image data from the RAM 2033 in such a reading method as above and transfers the read image data to the image bus I/F controller 2031.

Thus, the image bus I/F controller 2031 which received the image data subjected to the rotation processing transfers the data to the RAM 2002 or each device on the image bus 2008 based on continuous addressing.

Such a series of processing is repeated until the processing request from the CPU 2001 of the image controller 2000 ends (i.e., until processing of a necessary number of pages ends).

Figure 7:
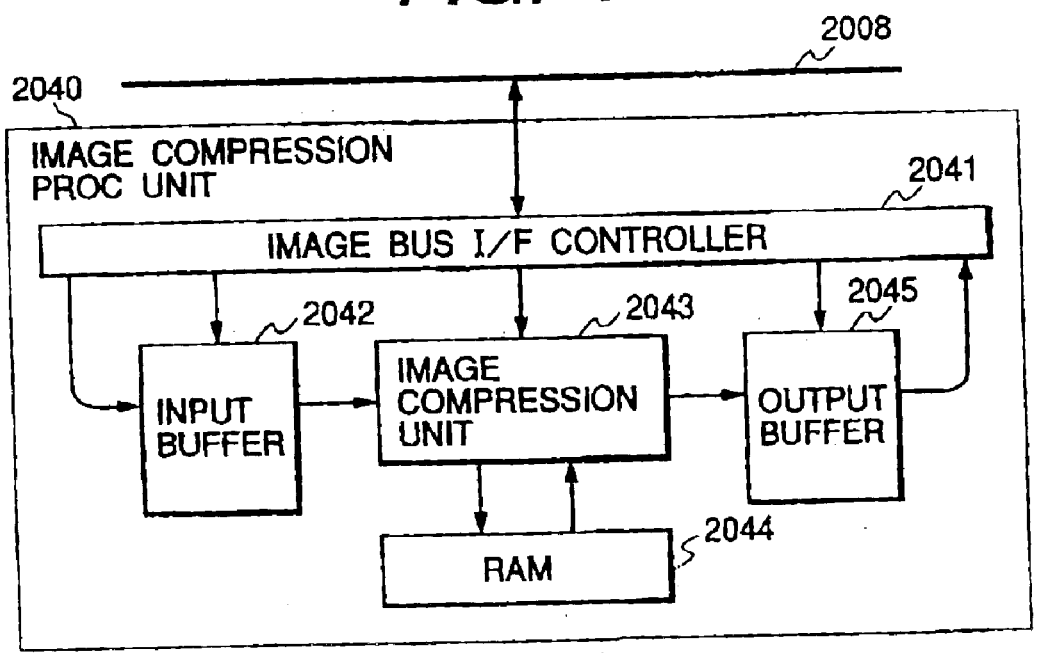
FIG. 7 is a block diagram showing a structure of an image compression processing unit according to the embodiment.

FIG. 7 is a block diagram showing the structure of the image compression processing unit 2040.

The image compression processing unit 2040 is composed of an image bus I/F controller 2041, an input buffer 2042, an image compression unit 2043, a RAM 2044 and an output buffer 2045.

The image bus I/F controller 2041 which is connected with the image bus 2008 has a function to control its bus accessing sequence. The image bus I/F controller 2041 performs timing control to exchange the data to the input and output buffers 2042 and 2045 and mode setting control to the image compression unit 2043.

An image compression processing procedure of the image compression processing unit 2040 will be explained.

The setting for image compression control is performed to the image bus I/F controller 2041 by the CPU 2001 of the image controller 2000 shown in FIG. 4 through the image bus 2008. By this setting, the image bus I/F controller 2041 performs setting (e.g., MMR compression setting, JBIG decompression setting and the like) necessary for the image compression to the image compression unit 2043. After performing the necessary setting, the CPU 2001 of the image controller 2000 again allows the image bus I/F controller 2041 to transfer the image data.

According to this allowance, the image bus I/F controller 2041 starts to transfer the image data from the RAM 2002 of the image controller 2000 or each device on the image bus 2008. The received image data is temporarily stored in the input buffer 2042, and the image is transferred at a constant speed in response to the image data request of the image compression unit 2043. At this time, the input buffer 2042 judges whether or not the image data can be transferred between the image bus I/F controller 2041 and the image compression unit 2043. When it is judged that reading of the image data from the image bus 2008 and writing of the image data in the image compression unit 2043 are impossible, it is controlled not to transfer any data (hereinafter, this controlling is simply called handshaking).

The image compression unit 2043 temporarily stores the received image data in the RAM 2044. This is because, when the image compression is performed, the data for several lines is necessary according to the kind of image compression processing to be performed. Namely, in order to perform the image compression processing for the first line, it is necessary to prepare the image data for several lines.

The image data subjected to the image compression processing is immediately transferred to the output buffer 2045. The output buffer 2045 performs the handshaking between the image bus I/F controller 2041 and the image compression unit 2043 to transfer the image data to the image bus I/F controller 2041. The image bus I/F controller 2041 further transfers the image data subjected to the compression (or decompression) processing to the RAM 2002 of the image controller 2000 or each device on the image bus 2008.

Such a series of processing is repeated until the processing request from the CPU 2001 of the image controller 2000 ends (i.e., until processing of a necessary number of pages ends) or until a stop request is sent from the image compression 2043 (i.e., until an error in the compression and decompression processing occurs).

FIG. 5 is a block diagram showing the structure of the scanner image processing unit 2080.

The scanner image processing unit 2080 is composed of an image bus I/F controller 2081, a filtering processing unit 2082, an editing processing unit 2083, a magnification change processing unit 2084, a table 2085 and a binarization processing unit 2086.

The image bus I/F controller 2081 which is connected with the image bus 2008 has a function to control its bus accessing sequence. Further, the image bus I/F controller 2081 controls each device in the scanner image processing unit 2080 and generates timing signals. The filtering processing unit 2082 is the spatial filter which performs convolution calculation. The editing processing unit 2083 recognizes, e.g., a closed area enclosed with a marker pen from the input image data, and then performs editing processing such as shadowing, screening, negative/positive reversing and the like to the image data in this closed area. The magnification change processing unit 2084 performs interpolation calculation to a main scan direction of a raster image to perform enlargement and reduction processing when changing a resolution of the read image. A sub scan direction of the raster image is subjected to a magnification change by changing scanning speed of an image reading line sensor (not shown). Here, it is judged whether the input image is a color original or a B/W original. Table 2085 performs table conversion to convert the image data (read luminance data) into density data. The binarization processing unit 2086 performs binarization to multivalue gray scale image data according to error diffusion processing or screening processing. After the processing, the obtained image data is again transferred to the image bus 2008 through the image bus I/F controller 2081.

Figure 6:
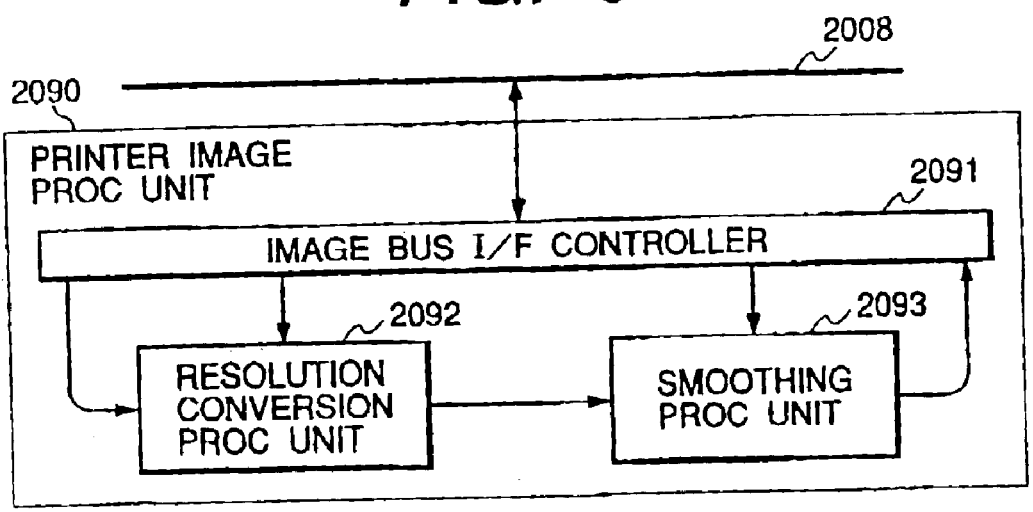
FIG. 6 is a block diagram showing a structure of a printer image processing unit according to the embodiment.

FIG. 6 is a block diagram showing the structure of the printer image processing unit 2090.

The printer image processing unit 2090 is composed of an image bus I/F controller 2091, a resolution conversion processing unit 2092 and a smoothing processing unit 2093.

The image bus I/F controller 2091 which is connected with the image bus 2008 has a function to control its bus accessing sequence. Further, the image bus I/F controller 2091 controls each device in the printer image processing unit 2090 and generates timing signals. The resolution conversion processing unit 2092 performs resolution conversion processing to convert the resolution of the image data transferred from the network 2010 of the image controller 2000 or the WAN 2051 shown in FIG. 2 into the resolution suitable for the printer 300 or 400. The smoothing processing unit 2093 performs processing to smooth a jaggy (image roughness appeared at the B/W boundary part of slants or the like) of the image data after the resolution conversion processing.

The operation of the image formation system according to the embodiment will be explained with reference to flow charts shown in FIGS. 12, 13, 14 and 15.

The operation of the image controller 2000 will be explained with reference to FIG. 12. The CPU 2001 of the image controller 2000 reads a program stored in a memory and executes it to perform this operation.

It is judged in step S1201 whether or not a start key on the operation unit 2012 is depressed by an operator. This judgment is repeated until the start key is depressed by the operator. When the start key is depressed, the original feeding is performed in a head-page processing mode in step S1202. In the original feeding, the original included in the sheaf on the tray 102 of the original feeder 101 of the scanner 100 is fed from the head page in due order. It is then judged in step S1203 whether or not the original is a color original (i.e., it is judged by prescanning the original image whether the original is a color original or a B/W original for each page). When judged that the original is a B/W original, then in step S1204 a sheet feed request (i.e., command data including an instruction to prepare the image formation operation (e.g., to start feed of a sheet to be subjected to image formation)) is transmitted to the B/W printer 300 through the data communication path, and the flow advances to a step S1206. Conversely, when judged in step S1203 that the original is a color original, then in step S1205 the sheet feed request is transmitted to the color printer 400 through the data communication path, and the flow advances to the step S1206.

In step S1206, the original image is read, and the flow advances to step S1207 to transmit the image to the printers 300 and 400 respectively. In step S1207, an image ID (identification) which acts as page number information representing which number the transmitted image is (i.e., which page the transmitted image is) is correlated with the sheet feed request data and transmitted for the image formation. Next, the flow advances to step S1208 to judge whether or not the original is the final original (i.e., the final page of the original sheaf). When judged that the original is not the final original, the flow returns to step S1202 to feed the original. Conversely, when judged that the original is the final original, the flow returns to step S1201 to judge whether or not the start key is depressed.

When it is judged in step S1203 that the original is a B/W original (B/W image data), in step S1207 the B/W image stored in the memory in step S1206 is transmitted to the B/W printer 300 together with the page number information through the data communication path. Conversely, when it is judged in step S1203 that the original is a color original (color image data), then the color image stored in the memory in step S1206 is subjected to the image rotation processing to be rotated by 180° by the image rotation processing unit 2030, and the rotated color image is transmitted to the color printer 400 together with the page number information through the data communication path.

By repeating the above processing until the final page of the job data, it is possible to transmit all the color-image pages and all the B/W-image pages in the series of images in the continuous page order of the plural pages mixedly including the color image and the B/W image, respectively to the color printer 400 and the B/W printer 300.

The operations of the B/W printer 300 and the color printer 400 will be explained with reference to FIG. 13. The undermentioned processing is the common processing to the B/W printer 300 and the color printer 400 respectively and performed in each printer by the CPU independently provided in each printer. The processing in the B/W printer 300 will be explained by way of example.

Figure 12:
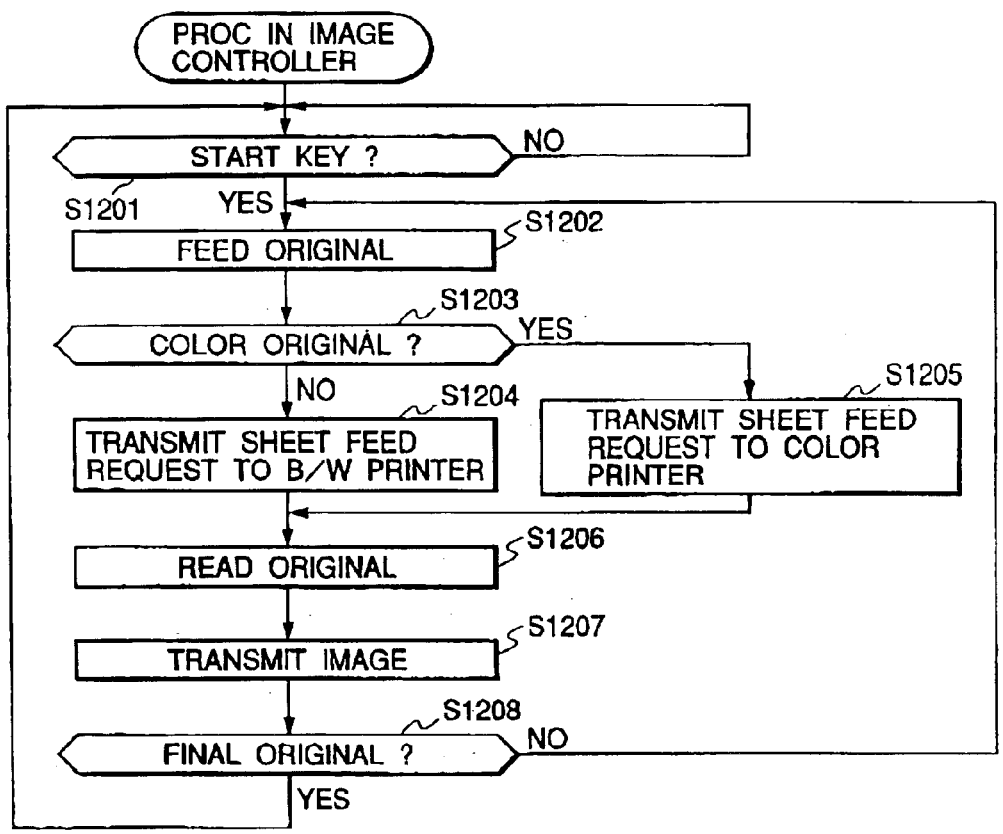
FIG. 12 is a flow chart for explaining a processing flow in the image controller according to the embodiment.
Figure 13:
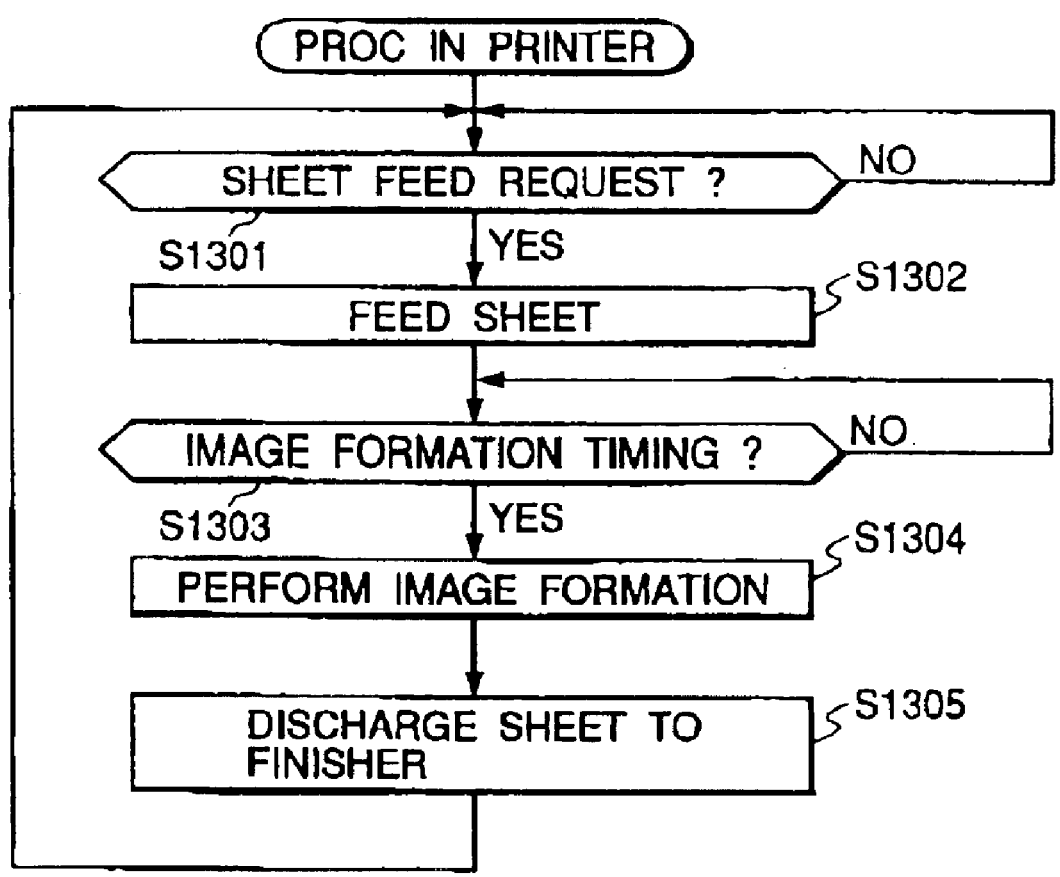
FIG. 13 is a flow chart for explaining a processing flow in each printer according to the embodiment.

In FIG. 13, it is first judged in step S1301 whether or not the sheet feed request (i.e., the command data including the instruction to start feed of the sheet to be subjected to the image formation) of the image controller 2000 output in step S1204 of FIG. 12 is received. This judgment is repeated until the sheet feed request is sent from the image controller 2000 through the data communication path.

When the sheet feed request is received, the sheet is fed from the sheet feed unit (the cassette 304, 305 or the like) in step S1302. Then, as preparation of the image formation operation ends (e.g., the sheet was carried to the vicinity of this side of the transfer unit 306), the image ID information which is output from the image controller 2000 and acquired by the B/W printer 300 in step S1207 of FIG. 12 is notified (or transmitted) together with the printer sheet feed information (including the information representing that the preparation of the image formation operation ended) from the control unit of the B/W printer 300 to the control unit of the finisher 500 through the data communication path, in order to notify the finisher 500 of such a fact.

Figure 15:
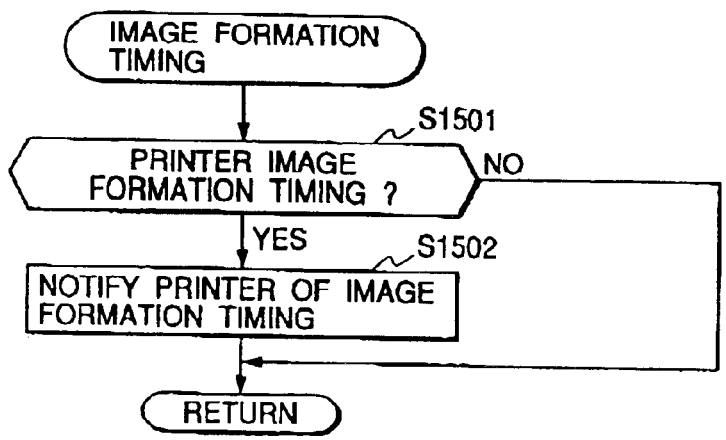
FIG. 15 is a flow chart for explaining a processing flow in an image formation timing check subroutine in the image formation system according to the embodiment.

The process advances to step S1303 to judge whether or not the image formation operation may begin. Thus, the B/W printer 300 stands by until the image formation operation may begin (namely, the printer 300 ends the preparation of the image formation operation and stands by so that the image formation operation may begin at once when there is a later-described instruction from the finisher 500). The processing in step S1303 is the processing which is performed based on whether or not an image formation timing request command (including information representing allowance of image formation operation start to release the stand-by status of the image formation operation) is received from the finisher 500 as the response result to the printer sheet feed information (e.g., the information representing that the preparation of the image formation operation has ended) transmitted in step S1302. When the B/W image from the image controller 2000 output in step S1207 of FIG. 12 is received and an image formation timing request command from the finisher 500 output in step S1502 of later-described FIG. 15 is received, the printer 300 judges the image formation timing, and the flow advances to step S1304 to perform the image formation of the page corresponding to the image ID. Next, in step S1305, the image-formed sheet is discharged to the finisher 500 (i.e., the sheet subjected to the image formation in the step S1304 is carried to the carrying path 551 in the finisher 500 with its image-formed face faceup), and the flow returns to step S1301 to judge whether or not the sheet feed request is received.

The color printer 400 performs the same processing as above under the control of its CPU. For example, in FIG. 13, it is first judged in step S1301 whether .or not the sheet feed request of the image controller 2000 output in step S1204 of FIG. 12 is received. When judged that the sheet feed request is received, the sheet is fed from the sheet feed unit (the cassette 304, 305 or the like) in ] step S1302. Then, as the preparation of the image formation operation ends, the image ID information acquired from the image controller 2000 is notified together with the printer sheet feed information (including the information representing that the preparation of the image formation operation ended) from the control unit of the color printer 400 to the control unit of the finisher 500 through the data communication path.

Next, the flow advances to the step S1303 to judge whether or not the. image formation operation may begin. Thus, the color printer 400 stands by until the image formation operation may begin. When the color image from the image controller 2000 output in step S1207 of FIG. 12 is received and an image formation timing request command from the finisher 500 output in step S1502 of FIG. 15 is received, the printer 400 judges that image formation may begin, and the flow advances to step S1304 to perform the image formation of the page corresponding to the image ID. In step S1304 for the color printer 400, only the image subjected to the rotation processing on the side of the image controller 2000 is formed on the sheet. Next, in step S1305, the processed sheet is discharged to the finisher 500 (i.e., the sheet subjected to the image formation in step S1304 is carried to the carrying path 501 in the finisher 500 with its image-formed face faceup), and the flow returns to step S1301 to judge whether or not the sheet feed request is received.

Figure 14:
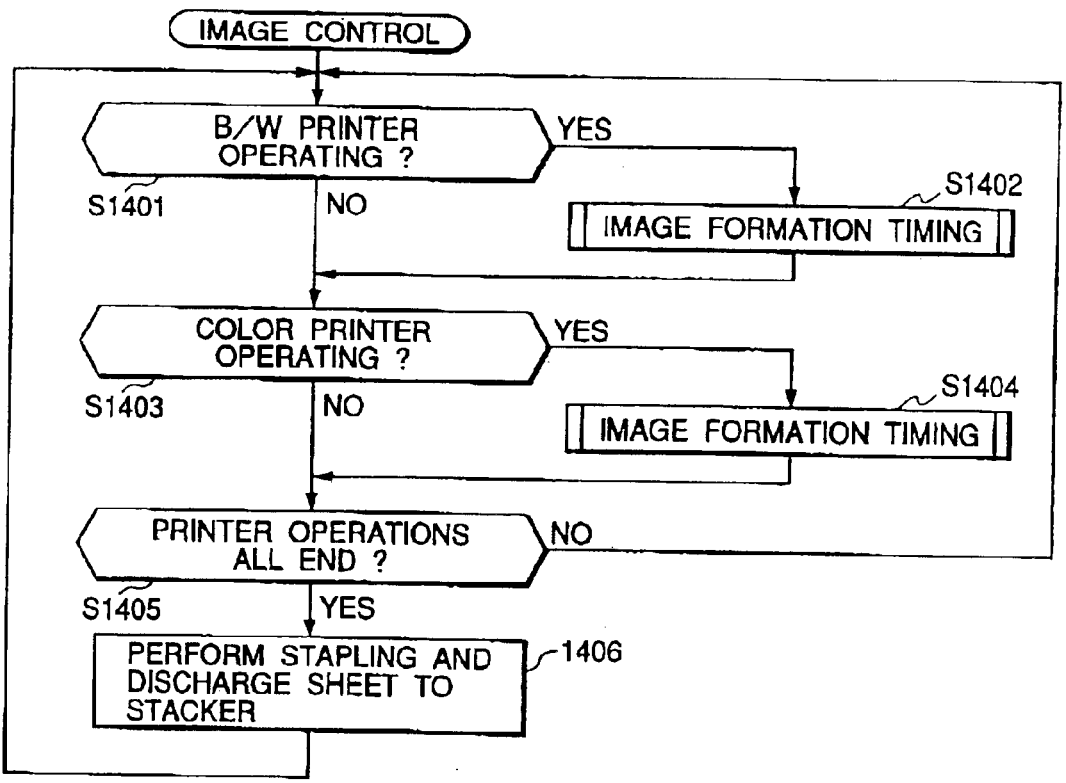
FIG. 14 is a flow chart for explaining a processing flow in the finisher according to the embodiment.

The operation (i.e., the processing) of the finisher 500 will be explained with reference to FIG. 14. This processing is performed by the CPU provided in the finisher 500.

It is first judged in step S1401 whether or not the B/W printer 300 is operating. At this time, the finisher 500 receives the image ID from the printer 300 correlated with the printer sheet feed information in step S1302 of FIG. 13 together with the printer sheet feed information through the data communication path, so as to check the page number. When judged that the B/W printer 300 is not operating, the flow advances to step S1403. Conversely, when judged that the B/W printer 300 is operating, the flow advances to step S1402 to call an image formation timing check subroutine, and the flow then advances to step S1403. The details of the processing in step S1402 will be described later.

In step S1403, it is judged whether or not the color printer 400 is operating. At this time, the finisher 500 receives the image ID from the printer 400 correlated with the printer sheet feed information in step S1302 of FIG. 13 together with the printer sheet feed information through the data communication path, so as to check the page number. When judged that the color printer 400 is not operating, the flow advances to step S1405. Conversely, when judged that the color printer 400 is operating, the flow advances to step S1404 to call an image formation timing check subroutine, and the flow then advances to step S1405. Also the details of the processing in step S1404 will be described later.

In step S1405, it is judged whether or not the overall operation of the printer ends (i.e., whether or not the image formation operation to the data to be compiled and bound as one group ends to the final page and a continuous series of sheets is entirely stacked on the processing tray 508). When judged that the overall operation ends, for example, in step S1406 the stapling processing is performed by the stapler 507 on the basis of an operator's instruction input by the operation unit 2102 in a stapling operation mode. Then the sheet sheaf processed on the processing tray 508 is discharged to a stacker unit (the stack tray 510 or the like), and the flow returns to step S1401 to judge whether or not the B/W printer 300 is operating. Conversely, when judged in step S1405 that the overall operation of the printer does not end, the flow returns to step S1401 to judge whether or not the B/W printer 300 is operating.

Next, the processing of the image formation timing check subroutine which is called in steps S1402 and S1404 in the flow chart shown in FIG. 14 will be explained with reference to FIG. 15.

In FIG. 15, it is first judged whether or not the image formation timing request command (including the information representing allowance of the image formation operation start to release the stand-by status of the image formation operation) is to be output to the printer, on the basis of judgment result data such as the image ID (i.e., the page number information capable of discriminating which page it is) received from the B/W printer 300 or the color printer 400 through the data communication path, the sheet processing statuses on the finisher 500 (i.e., Which page is being processed now? Where on the carrying path is the page? Is the stapling processing performed on the processing tray 508? Is it necessary to perform the stapling processing after the current processing? When the stapling processing is to be performed, it is one-point stapling or two-point stapling? What is the kind of sheet processing?), the type of image formation apparatus which requested to release the stand-by status of the image formation operation (i.e., whether the printer to perform the image formation is the color printer 400 or the B/W printer 300), and the like. When judged that the command is to be output, it is further judged which of the B/W printer 300 and the color printer 400 the command is output to. Further, it is judged whether or not the printers 300 and 400 are at the image formation timing. When judged that the printers 300 and 400 are at the image formation timing (stand-by status), the flow advances to step S1502 to notify (transmit) the printers 300 and 400 of the image formation timing request command through the data communication path at appropriate timing, and the flow returns. Conversely, when judged in step S1501 that the printers 300 and 400 are not at the image formation timing (stand-by status), the flow skips over step S1502 and returns.

Hereinafter, some examples that the finisher 500 outputs the image formation timing request command (i.e., the command to release the stand-by status of the image formation operation and allow the image formation operation) will be explained.

For example, it is assumed that the sheet being carried does not exist on the carrying path in the finisher 500 and the page number of the uppermost sheet of the sheaf stacked on the tray 508 is the second page. In this situation, it is further assumed that the printer sheet feed information (including the information representing that the preparation of the image formation operation ended) and the image ID are output from both the printers 300 and 400 at the same timing, the image ID (i.e., the page number information) received from the B/W printer 300 represents the fourth page, and the page information received from the color printer 400 represents the third page. In this case, the control unit of the finisher 500 outputs the image formation timing request command as the response result for the printer sheet feed information to the control unit of the color printer 400 through the data communication path to cause the color printer 400 to start the image formation for the third page. Conversely, the B/W printer 300 is on standby and holds the image formation operation for the fourth page (i.e., the image formation timing request command is not output to the B/W printer 300 now). Then the rotation-processed color image is formed on the sheet by the color printer 400, the sheet is carried from the carrying path 501 to the inside of the finisher 500, and the carried sheet is stacked on the processing tray 508. According to the sheet stacking, the image formation timing request command is output to the B/W printer 300 through the data communication path to release the stand-by status of the image formation operation and allow a start of the image formation operation for the fourth page on the side of the B/W printer 300. Then the sheet on which the B/W image of the fourth page was formed is guided from the carrying path 551 into the finisher 500 and stacked on the processing tray 508.

Further, for example, at the time when the printer sheet feed information (including the information representing that the preparation of the image formation operation ended) and the image ID are received from the color printer 400, it is assumed that the sheet on which the image of the second page was formed is not yet stacked on the tray 508 but is being carried on the carrying path in the finisher 500. In this case, when the image of the third page is formed on the sheet by the color printer 400 and this image-formed sheet is carried into the finisher 500, if it is judged to be able to stack the sheet of the second page on the tray 508 (i.e., if it is apparent that the processing is possible with the consecutive page order maintained, without any trouble such as incomplete page order or the like), the image formation timing request command is output to the color printer 400 to allow the image formation operation even if, e.g., the previous-page sheet is being carried in the finisher 500. Thus, the image formation operation for the third page in the color printer 400 is started. In the above operation, sheet carrying situation data in the finisher 500 is acquired and managed on the basis of a sheet presence/absence detection signal from one or plural sensors (not shown) disposed on the carrying path of the finisher 500.

Further, for example, there are two cases, i.e., a first case where the previously processed sheet is the sheet of the final page in the sheet sheaf processed as one group (i.e., a break or discontinuity), and a second case where the previously processed sheet is merely the one-previous sheet in the identical group. As to the data corresponding to the page in the image formation operation waiting status, timing of outputting the image formation timing request command in the first case is delayed from timing of outputting the image formation timing request command in the second case because a time for discharging the sheaf from the processing tray 508 to the stack tray 510 is necessary in the first case. The information concerning the page number of the sheet processed prior to the page to which the image formation operation is on standby, the information concerning the break or discontinuity of the sheaf to be processed as one group, and the like can be previously acquired, e.g., on the basis of the counted result of the number of originals included in the original sheaf in case of prescanning by the original feeder 101, or an operator's input instruction (i.e., instructions of the number of output sheets and setting of the number of output sheets) from the operation unit 2012.

Similarly, in the case where the previously processed sheet is the sheet of the final page in the sheet sheaf processed as one group, there are further two cases, i.e., a first case where the sheet is in a job to which the stapling processing is necessary, and a second case where the sheet is in a job to which the stapling processing is not necessary. In this situation, timing of outputting the image formation timing request command in the first case is delayed from the timing of outputting the image formation timing request command in the second case because a time for performing the stapling processing on the processing tray 508 is necessary in the first case.

Further, in the case where the previously processed sheet is in the job to which the stapling processing is necessary, there are further two cases, i.e., a first case where the stapling is performed at two points, and a second case where the stapling is performed at one point. In this situation, timing of outputting the image formation timing request command in the first case is delayed from the timing of outputting the image formation timing request command in the second case. The information concerning whether or not sheet processing such as the stapling processing or the like is to be performed to the sheet in the previous job, or the information concerning what kind of processing is to be performed as the sheet processing can be previously acquired, e.g., on the basis of an operator's input instruction from the operation unit 2012.

Further, a time necessary for the image formation processing of one sheet in the color printer 400 is longer than a time necessary for the image formation processing of one sheet in the B/W printer 300. When the rotation processing is not performed on the side of the image controller 2000, since it is necessary to perform the image rotation processing on the side of the color printer 400, the time necessary for the image formation processing in the color printer 400 is longer than the time necessary for the image formation processing in the BJW printer 300. As described above, the sheet from the B/W printer 300 can be easily inverted through the curved carrying path in the finisher 500, while the sheet from the color printer 400 is inverted by switchback sheet carrying on the carrying path 504. For this reason, a time after the image formation timing request command is output from the finisher 500 to the B/W printer 300 until the sheet from the B/W printer 300 reaches in the finisher 500 is absolutely shorter than a time after the image formation timing request command is output from the finisher 500 to the color printer 400 until the sheet from the color printer 400 reaches in the finisher 500.

In consideration of such a situation, timing of outputting the image formation timing request command in a first case where the image formation operation is on standby and the printer requesting the finisher 500 to start the image formation operation is the B/W printer 300 is delayed from timing of outputting the image formation timing request command in a second case where the image formation operation is on standby and the printer requesting the finisher 500 to start the image formation operation is the color printer 400. Namely, since it takes time for the processing in case of the color printer 400, even if the image formation timing request command is output from the color printer 400 before the image formation timing request command is output from the B/W printer 300, disadvantages that the sheets are doubly carried in the finisher 550, the page order is changed when the sheets are stacked on the tray 508, and the like do not occur. Thus, timing of outputting the image formation timing request command can be differentiated for each printer irrespective of the processing situation on the side of the finisher 500.

As understood from the above concrete explanation, in the embodiment, the control unit of the finisher 500 determines the timing of outputting the image formation timing request command on the basis of the image ID acting as the page number information in the status that the image formation operation is on standby, and the information concerning the sheet processing situation in the finisher 500, and the information concerning the page number of the sheet processed prior to the page to which the image formation operation is on standby, and the information concerning the break or discontinuity of the sheaf to be processed as one group, and the information concerning whether or not the sheet processing such as the stapling processing or the like is to be performed to the sheet in the previous job, or the information concerning what kind of processing is to be performed as the sheet processing, and the information concerning whether the apparatus requesting the finisher 500 to start the image formation operation in the image formation operation standby status is the B/W printer 300 or the color printer 400, and the information concerning whether or not the rotation processing is necessary to the image of the page in the image formation operation standby status, and the information concerning whether or not the switchback sheet carrying is necessary to invert the sheet on which the image data was formed, and the like. For example, by differentiating the timing of outputting the image formation timing request command for each printer, it is controlled for one (or counter) printer to release the standby status of the image formation operation and thus allow start of the image formation operation, while it is controlled for the other printer to maintain the standby status of the image formation operation.

As above, the data mixedly including different-type plural images such as color and B/W images is input, each of the plural pages is processed in real time from the head page, the color printer 400 performs the color image formation, the B/W printer 300 performs the B/W image formation, and the plural sheets on which the images were formed respectively by these different printers are directly introduced into the finisher 500 without an operator's manual effort. The image-formed faces (facedown), the image directions, the binding (or stapling) positions, the page order and the like are adjusted for these plural sheets and automatically subjected to bookbinding as one group. The system is structured as shown in, for example, FIG. 4B to achieve such an operation. Further, it causes the image controller 2000, the finisher 500, the color printer 400, the B/W printer 300 and the like to mutually exchange various information such as the page number information, the information concerning the processing situation of the own apparatus, the information concerning the image to be formed on the sheet, the information concerning the operation mode, and the like among them through the data communication path. Thus the image formation operation for each page can be performed by each printer at appropriate timing, and the respective apparatuses are adjusted and cooperated, thereby smoothly controlling and using the system.

Thus, even if the data mixedly includes different-type plural images, such as the color and B/W images, is input, each of the plural pages can be processed in real time from the head page, the color printer 400 can perform the color image formation, and the B/W printer 300 can perform the B/W image formation. Then, the image-formed faces (facedown), the image directions, the binding (or stapling) positions, the page order and the like for these plural sheets can be adjusted and bound as one sheaf Further, in the above series of processing, it is possible to dispense with the operator's assistive operation and automate the processing itself Thus, when the data mixedly includes different-type plural images, such as the color and B/W images, is output, it is possible to automate the system use and improve productivity and cost performance without operator's complicated assistive operation.

Therefore, for example, even if one job mixedly includes different-type plural data, such as the color and B/W image data, it is possible to eliminate the disadvantage that printing can be performed only by either of the color printer and the B/W printer. It is also possible to eliminate the complicated working that an operator judges whether each page is to be subjected to printing by the color printer or the B/W printer, perform printing designation for each page, and select the appropriate printer at each printing designation. Further, it is possible to eliminate the operator having to manually rearrange the sheets, respectively printing processed by the color and B/W printers and compile or bind the rearranged sheets to produce one book-bound thing.

Further, it is possible to eliminate the operator's assistive operation that the operator himself takes the image-formed sheets from the sheet discharge units of the plural printers and sets the taken sheets to a special sheet processing apparatus capable of automatically rearranging the sheets in the page order. Accordingly, it is possible to obviate the disadvantage that an operator who is unfamiliar to the sheet processing apparatus erroneously operates or handles it because he does not understand how to set the group of sheets output from the respective image formation apparatuses to the sheet processing apparatus. Further, it is possible to obviate the disadvantage that, due to the above operator's erroneous operation, the processing to compile and bind the sheets output from the respective image formation apparatuses into one is not correctly performed in the sheet processing apparatus, and the sheets are subjected to the stapling processing as it is, are thus wasted.

The embodiment is also applicable to a case where one job data which is composed of character image data and photographic image data as plural different-type data is input.

The above-described functions of the image formation system according to the embodiment are realized according as a computer reads and executes a control program stored in a storage medium. However, the present invention is not limited to this. Namely, it is needless to say that the present invention also includes a case where an OS (operating system) running on the computer performs a part or all of actual processing on the basis of an instruction of the control program and the above-described functions of the embodiment are realized by such the processing.

As the storage medium for storing the control program, for example, a floppy disk, a hard disk, an optical disk, a magnetooptical disk, a CD-ROM (compact disk read-only memory), a CD-R (compact disk recordable), a magnetic tape, a nonvolatile memory card, a ROM chip or the like can be used.

What is claimed is:

1. A control method for an image formation system which causes a first image formation apparatus for forming a color image and a second image formation apparatus for forming a black and white image to cooperate with each other in forming on at least one of a plurality of sheets, using toner, a series of images including a color image and a black and white image inputted from an image input unit through an image control apparatus, and causes a sheet processing apparatus to compile the sheets on which the color images were formed by the first image formation apparatus and the sheets on which the black and white images were formed by the second image formation apparatus as one sheet sheaf where the first image formation apparatus, the second image formation apparatus and the sheet processing apparatus are electrically connected with others through a data communication path, said method comprising:

an input image discrimination step, of discriminating whether the image inputted from the image input unit is a color image or a black and white image;

a development step, of setting the toner by which the first and second image formation apparatuses form the images;

a distribution step, of distributing image formation to the first and second image formation apparatuses in accordance with the color content of the image inputted from the image input unit and the color by which the image can be formed, wherein said distribution step includes a judgment step of judging in the series of images whether the image is a color image or a black and white image;

a first transmission step, of correlating first instruction data, including an instruction to perform preparation of the image formation operation, with page number information of the image to be formed on the sheet and for selectively transmitting the correlated data to the first and second image formation apparatuses, according to the judgement in said judgment step;

a first reception step, executed in the first image formation apparatus, of receiving the first instruction data, the page number information and an image corresponding to the page number information;

a first notification step, executed in the first image formation apparatus, of performing preparation to form the color image of the page corresponding to the page number information on the sheet, correlating the preparation with the page number information, and notifying the sheet processing apparatus of the correlated data through the data communication path, according to the reception of the first instruction data in said first reception step;

a second reception step, executed in the second image formation apparatus, of receiving the first instruction data, the page number information and an image corresponding to the page number information;

a second notification step, executed in the second image formation apparatus, of performing preparation to form the black and white image of the page corresponding to the page number information on the sheet, correlating the preparation with the page number information, and notifying the sheet processing apparatus of the correlated data through the data communication path according to the reception of the first instruction data in said second reception step;

a third reception step, executed in the sheet processing apparatus, of receiving the page number information in said first notification step and said second notification step through the data communication path;

a second transmission step, executed in the sheet processing apparatus, of selectively transmitting second instruction data including an instruction to allow the start of the image formation operation to the first and second image formation apparatuses through the data communication path, on the basis of the page number information received in said third reception step; and a postprocessing step, of simultaneously performing postprocessing on the plurality of sheets on which the images were formed, respectively by the first and second image formation apparatuses.

2. A method according to claim 1, further comprising a control step, of controlling operation timing of the first and second image formation apparatuses such that said postprocessing step can perform postprocessing on the sheets.

3. A method according to claim 1, wherein the image input unit is a scanner.

4. A method according to claim 1, wherein the image formation apparatus is a printer.

5. An image formation system, which causes a first image formation apparatus for forming a color image and a second image formation apparatus for forming a black and white image to cooperate with each other in forming on at least one of a plurality of sheets, using toner, a series of images including a color image and a black and white image inputted from an image input unit through an image control apparatus, and which causes a sheet processing apparatus to compile the sheets on which the color images were formed by said first image formation apparatus and the sheets on which the black and white images were formed by said second image formation apparatus as one sheet sheaf where said first image formation apparatus, said second image formation apparatus and said sheet processing apparatus are electrically connected with others through a data communication path, said system comprising:

input image discrimination means for discriminating whether the image inputted from the image input unit is a color image or a black and white image;

development means for setting the toner by which said first and second image formation apparatuses form the images;

distribution means for distributing image formation to said first and second image formation apparatuses in accordance with the color content of the image inputted from the image input unit and the color by which the image can be formed, wherein said distribution means includes judgment means for judging in the series of images whether the image is a color image or a black and white image;

first transmission means for correlating first instruction data, including an instruction to perform preparation of the image formation operation, with page number information of the image to be formed on the sheet and for selectively transmitting the correlated data to said first and second image formation apparatuses, according to the judgement by said judgment means;

first reception means, provided in said first image formation apparatus, of receiving the first instruction data, the page number information and an image corresponding to the page number information;

first notification means, provided in said first image formation apparatus, for performing preparation to form the color image of the page corresponding to the page number information on the sheet, correlating the preparation with the page number information, and notifying said sheet processing apparatus of the correlated data through the data communication path, according to the reception of the first instruction data by said first reception means;

second reception means, provided in said second image formation apparatus, for receiving the first instruction data, the page number information and an image corresponding to the page number information;

second notification means, provided in said second image formation apparatus, for performing preparation to form the black and white image of the page corresponding to the page number information on the sheet, correlating the preparation with the page number information, and notifying said sheet processing apparatus of the correlated data through the data communication path according to the reception of the first instruction data by said second reception means;

third reception means, provided in said sheet processing apparatus, of receiving the page number information from said first notification means and said second notification means through the data communication path;

second transmission means, provided in said sheet processing apparatus, for selectively transmitting second instruction data including an instruction to allow the start of the image formation operation to said first and second image formation apparatuses through the data communication path, on the basis of the page number information received by said third reception means; and postprocessing means for simultaneously performing postprocessing on the plurality of sheets on which the images were formed, respectively by said first and second image formation apparatuses.

6. A system according to claim 5, further comprising control means for controlling operation timing of the first and second image formation apparatuses such that said postprocessing means can perform the postprocessing to the sheets.

7. A system according to claim 5, wherein the image input unit is a scanner.

8. A system according to claim 5, wherein the image formation apparatus is a printer.

9. A storage medium storing a control program to control an image formation system, which causes a first image formation apparatus for forming a color image and a second image formation apparatus for forming a black and white image to cooperate with each other in forming on at least one of a plurality of sheets, using toner, a series of images including a color image and a black and white image inputted from an image input unit through an image control apparatus, and which causes a sheet processing apparatus to compile the sheets on which the color images were formed by the first image formation apparatus and the sheets on which the black and white images were formed by the second image formation apparatus as one sheet sheaf where the first image formation apparatus, the second image formation apparatus and the sheet processing apparatus are electrically connected with others through a data communication path, said control program comprising:

code for discriminating whether the image input from the image input unit is a color image or a black and white image;

code for setting the toner by which the first and second image formation apparatuses form the images;

code for distributing image formation to the first and second image formation apparatuses in accordance with the color content of the image inputted from the image input unit and the color by which the image can be formed, wherein said distribution code includes code for judging in the series of images whether the image is a color image or a black and white image;

code for correlating first instruction data, including an instruction to perform preparation of the image formation operation, with page number information of the image to be formed on the sheet and for selectively transmitting the correlated data to the first and second image formation apparatuses, according to the judgement by said judgment code;

executed in the first image formation apparatus, code for receiving the first instruction data, the page number information and an image corresponding to the page number information;

executed in the first image formation apparatus, code for performing preparation to form the color image of the page corresponding to the page number information on the sheet, correlating the preparation with the page number information, and notifying the sheet processing apparatus of the correlated data through the data communication path, according to the reception of the first instruction data by said first reception code;

executed in the second image formation apparatus, code for receiving the first instruction data, the page number information and an image corresponding to the page number information;

executed in the second image formation apparatus, code for performing preparation to form the black and white image of the page corresponding to the page number information on the sheet, correlating the preparation with the page number information, and notifying the sheet processing apparatus of the correlated data through the data communication path according to the reception of the first instruction data by said second reception code;

executed in the sheet processing apparatus, code for receiving the page number information from said first notification code and said second notification code through the data communication path;

executed in the sheet processing apparatus, code for selectively transmitting second instruction data including an instruction to allow the start of the image formation operation to the first and second image formation apparatuses through the data communication path, on the basis of the page number information received by said third reception code; and code for simultaneously performing postprocessing on the plurality the sheets on which the images were formed respectively by the first and second image formation apparatuses.

10. A storage medium according to claim 9, wherein said control program further comprises code for controlling an operation timing of the first and second image formation apparatuses such that said code for postprocessing controls the postprocessing on the sheets.

11. A storage medium according to claim 9, wherein the image input unit is a scanner.

12. A storage medium according to claim 9, wherein the image formation apparatus is a printer.

13. An image formation system which forms on at least one of a plurality of sheets a series of images composed of plural pages in continuous page order including a color image and a black and white image from an image generation source, said image formation system comprising:

a first image formation apparatus adapted to form the color image on the sheet;

a second image formation apparatus adapted to form the black and white image on the sheet;

a sheet processing apparatus adapted to compile the sheets on which the color images were formed by said first image formation apparatus and the sheets on which the black and white images were formed by said second image formation apparatus as one sheet sheaf;

judgment means for judging in the series of images whether the image is the color image or the black and white image;

first transmission means for correlating first instruction data, including an instruction to perform preparation of the image formation operation, with page number information of the image to be formed on the sheet and for selectively transmitting the correlated data to said first and second image formation apparatuses, according to the judgement of said judgment means;

first reception means, provided in said first image formation apparatus, for receiving the first instruction data, the page number information and an image corresponding to the page number information;

first notification means, provided in said first image formation apparatus, for performing preparation to form the color image of the page corresponding to the page number information on the sheet, correlating the preparation with the page number information, and notifying said sheet processing apparatus of the correlated data through the data communication path, according to the reception of the first instruction data by said first reception means;

second reception means, provided in said second image formation apparatus, for receiving the first instruction data, the page number information and an image corresponding to the page number information;

second notification means, provided in said second image formation apparatus, for performing preparation to form the black and white image of the page corresponding to the page number information on the sheet, correlating the preparation with the page number information, and notifying said sheet processing apparatus of the correlated data through the data communication path according to the reception of the first instruction data by said second reception means;

third reception means, provided in said sheet processing apparatus, for receiving the page number information from said first notification means and said second notification means through the data communication path; and second transmission means, provided in said sheet processing apparatus, for selectively transmitting second instruction data including an instruction to allow the start of the image formation operation to said first and second image formation apparatuses through the data communication path, on the basis of the page number information received by said third reception means, wherein said first and second image formation apparatuses and said sheet processing apparatus are electrically connected with each other through a data communication path such that said first and second image formation apparatuses and said sheet processing apparatus can perform data communication with each other, and said first and second image formation apparatuses and said sheet processing apparatus are mechanically connected with each other such that the sheets discharged from said first and second image formation apparatuses can be carried to a sheet carrying path of said sheet processing apparatus without any operator's manual labor, wherein the image formation operation in said first image formation apparatus and the image formation operation in said second image formation apparatus are selectively set to be on standby so as to allow said processing apparatus to compile the sheets from said first image formation apparatus and the sheets from said second image formation apparatus as one sheet sheaf with the continuous page order maintained.

14. A system according to claim 13, wherein the image formation operation by said first and second image formation apparatuses will not start without receiving the second instruction data from said second transmission means.

15. A system according to claim 13, wherein said second transmission means differentiates timing of the output of the second instruction data, according to whether the second instruction data is output to said first image formation apparatus or to said second image formation apparatus.

16. A system according to claim 15, wherein a delay in outputting the second instruction data by said second transmission means to said second image formation apparatus is longer than a delay in outputting the second instruction data by said second transmission means to said first image formation apparatus.

17. A system according to claim 13, wherein said second transmission means determines the timing of outputting the second instruction data on the basis of the page number information received by said third reception means and a sheet processing situation in said sheet processing apparatus.

18. A system according to claim 17, wherein said second transmission means determines the timing of outputting the second instruction data on the basis of the page number information received by said third reception means, the sheet processing situation in said sheet processing apparatus, and determination concerning which of said first and second image formation apparatuses the second instruction data is to be output to.

19. A system according to claim 13, wherein it is determined which of the image formation operations of said first and second image formation apparatuses is to be set on standby, on the basis of a page number of the sheet on which the image was formed by either said first image formation apparatus or said second image formation apparatus and which is carried to the sheet carrying path of said sheet processing apparatus.

20. A system according to claim 13, further comprising stacking means, provided in said sheet processing apparatus, for stacking the sheets carried from said first and second image formation apparatuses through the sheet carrying path.

21. A system according to claim 20, wherein the sheets carried from said first and second image formation apparatuses are stacked on said stacking means with their image-formed faces facedown regardless of which image formation apparatus formed the sheets.

22. A system according to claim 20, further comprising stapling means, provided in said sheet processing apparatus and on said stacking means, for performing stapling processing to the sheaf of the sheets carried from said first and second image formation apparatuses.

23. A system according to claim 13, further comprising stacking means, provided in said sheet processing apparatus, for stacking the sheets carried from said first and second image formation apparatuses through the sheet carrying path, wherein the image formation operation of said first image formation apparatus and the image formation operation of said second image formation apparatus are selectively set to be on standby and the sheets carried from said first and second image formation apparatuses are stacked on said stacking means with their image-formed faces facedown regardless of which image formation apparatus formed the sheets.

24. A system according to claim 13, wherein said first and second image formation apparatuses and said sheet processing apparatus are mechanically connected with each other such that the sheet processing apparatus is located between said first and second image formation apparatuses.

25. A system according to claim 13, further comprising image processing means for performing, prior to the image formation operation, rotation processing to the image supplied from the image generation source.

26. A system according to claim 25, wherein said image processing means performs the image rotation processing only to the image formed by either of said first and second image formation apparatuses.

27. A system according to claim 26, wherein said image processing means performs image rotation processing to the image formed by either of said first and second image formation apparatuses, according to whether said first and second image formation apparatuses are reverse connected to said sheet processing apparatus.

28. A control method for an image formation system which forms on a sheet a series of images composed of plural pages in continuous page order including a color image and a black and white image from an image generation source, wherein the image formation system comprises a first image formation apparatus adapted to form the color image on the sheet, a second image formation apparatus adapted to form the black and white image on the sheet, and a sheet processing apparatus adapted to compile the sheets on which the color images were formed by the first image formation apparatus and the sheets on which the black and white images were formed by the second image formation apparatus as one sheet sheaf, and wherein the first and second image formation apparatuses and the sheet processing apparatus are electrically connected with each other through a data communication path such that the first and second image formation apparatuses and the sheet processing apparatus can perform data communication with others, and the first and second image formation apparatuses and the sheet processing apparatus are mechanically connected with each other such that the sheets discharged from the first and second image formation apparatuses can be carried to a sheet carrying path of the sheet processing apparatus without any manual labor by an operator, said control method comprising:

a judgment step, of judging in the series of images whether the image of each page is the color image or the black and white image;

a first transmission step, of correlating first instruction data, including an instruction to perform preparation of the image formation operation, with page number information of the image to be formed on the sheet and for selectively transmitting the correlated data to the first and second image formation apparatuses, according to the judgement in said judgment step;

a first reception step, performed in the first image formation apparatus, of r receiving the first instruction data, the page number information and an image corresponding to the page number information;

a first notification step, performed in the first image formation apparatus, of performing preparation to form the color image of the page corresponding to the page number information on the sheet, correlating the preparation with the page number information, and notifying the sheet processing apparatus of the correlated data through the data communication path, according to the reception of the first instruction data in said first reception step;

a second reception step, performed in the second image formation apparatus, of receiving the first instruction data, the page number information and an image corresponding to the page number information;

a second notification step, performed in the second image formation apparatus, of performing preparation to form the black and white image of the page corresponding to the page number information on the sheet, correlating the preparation with the page number information, and notifying the sheet processing apparatus of the correlated data through the data communication path according to the reception of the first instruction data in said second reception step;

a third reception step, performed in the sheet processing apparatus, of receiving the page number information in said first notification step and said second notification step through the data communication path;

a second transmission step, performed in the sheet processing apparatus, for selectively transmitting second instruction data including an instruction to allow the start of the image formation operation to the first and second image formation apparatuses through the data communication path, on the basis of the page number information received in said third reception step;

a control step, of controlling such that, in the series of images, pages corresponding to the color images are subjected to image formation by the first image formation apparatus and pages corresponding to the black and white images are subjected to image formation by the second image formation apparatus; and a set step, of selectively setting, in the sheet processing apparatus, the image formation operation in the first image formation apparatus and the image formation operation in the second image formation apparatus to be on standby so as to compile the sheets from the first image formation apparatus and the sheets from the second image formation apparatus as one sheet sheaf with the continuous page order maintained.

29. A computer-readable storage medium storing a program to cause an image formation system for forming on a sheet a series of images composed of plural pages in continuous page order including a color image and a black and white image from an image generation source, wherein the image formation system comprises a first image formation apparatus adapted to form the color image on the sheet, a second image formation apparatus adapted to form the black and white image on the sheet, and a sheet processing apparatus adapted to compile the sheets on which the color images were formed by the first image formation apparatus and the sheets on which the black and white images were formed by the second image formation apparatus as one sheet sheaf, and wherein the first and second image formation apparatuses and the sheet processing apparatus are electrically connected with each other through a data communication path such that the first and second image formation apparatuses and the sheet processing apparatus can perform data communication with each other, and the first and second image formation apparatuses and the sheet processing apparatus are mechanically connected with each other such that the sheets discharged from the first and second image formation apparatuses can be carried to a sheet carrying path of v sheet processing apparatus without any operator's manual working, said program comprising:

code for a judgment step, of judging in the series of images whether the image of each page is the color image or the black and white image;

code for a first transmission step, of correlating first instruction data, including an instruction to perform preparation of the image formation operation, with page number information of the image to be formed on the sheet and for selectively transmitting the correlated data to the first and second image formation apparatuses, according to the judgement by said code for a judgment step;

code for a first reception step, performed in the first image formation apparatus, of r receiving the first instruction data, the page number information and an image corresponding to the page number information;

code for a first notification step, performed in the first image formation apparatus, of performing preparation to form the color image of the page corresponding to the page number information on the sheet, correlating the preparation with the page number information, and notifying the sheet processing apparatus of the correlated data through the data communication path, according to the reception of the first instruction data by said code for a first reception step;

code for a second reception step, performed in the second image formation apparatus, of receiving the first instruction data, the page number information and an image corresponding to the page number information;

code for a second notification step, performed in the second image formation apparatus, of performing preparation to form the black and white image of the page corresponding to the page number information on the sheet, correlating the preparation with the page number information, and notifying the sheet processing apparatus of the correlated data through the data communication path according to the reception of the first instruction data by said code for a second reception step;

code for a third reception step, performed in the sheet processing apparatus, of receiving the page number information by said code for a first notification step and said code for a second notification step through the data communication path;

code for a second transmission step, performed in the sheet processing apparatus, for selectively transmitting second instruction data including an instruction to allow the start of the image formation operation to the first and second image formation apparatuses through the data communication path, on the basis of the page number information received by said code for a third reception step;

code for a control step, of controlling that, in the series of images, pages corresponding to the color images are subjected to image formation by the first image formation apparatus and pages corresponding to the black and white images are subjected to image formation by the second image formation apparatus; and code for a set step, of selectively setting, in the sheet processing apparatus, the image formation operation in the first image formation apparatus and the image formation operation in the second image formation apparatus to be on standby so as to compile the sheets from the first image formation apparatus and the sheets from the second image formation apparatus as one sheet sheaf with the continuous page order maintained.

* * * * *